United States Patent
Li et al.

(10) Patent No.: US 7,703,088 B2
(45) Date of Patent: Apr. 20, 2010

(54) COMPRESSING "WARM" CODE IN A DYNAMIC BINARY TRANSLATION ENVIRONMENT

(75) Inventors: Zhiyuan Li, West Lafayette, IN (US); Youfeng Wu, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 1236 days.

(21) Appl. No.: 11/240,551

(22) Filed: Sep. 30, 2005

(65) Prior Publication Data

US 2007/0079296 A1 Apr. 5, 2007

(51) Int. Cl.
*G06F 9/45* (2006.01)

(52) U.S. Cl. .................. 717/159; 717/139; 717/140; 717/148

(58) Field of Classification Search .................. None
See application file for complete search history.

(56) References Cited

U.S. PATENT DOCUMENTS

| | | | | |
|---|---|---|---|---|
| 5,794,010 A | * | 8/1998 | Worrell et al. | 703/20 |
| 6,044,220 A | * | 3/2000 | Breternitz, Jr. | 717/139 |
| 6,263,429 B1 | * | 7/2001 | Siska | 712/245 |
| 6,317,873 B1 | * | 11/2001 | Townsend | 717/143 |
| 7,051,189 B2 | * | 5/2006 | Warnes | 712/210 |
| 2003/0009596 A1 | * | 1/2003 | Tonomura | 709/247 |
| 2006/0277530 A1 | * | 12/2006 | Wu et al. | 717/136 |

OTHER PUBLICATIONS

Lefurgy et al., "Improving Cpde Density Using Compression Techniques", IEEE 1997 pp. 194-203.*
Charles Robert Lefurgy, "Space-efficient Executable program Representations for Embedded Microprocessors" 1998, pp. 1-42.*
Lefurgy et al., "Reducing Code Size with Run-time Decompression" IEEE, Publication Date: 2000, pp. 218-228.*
Bich C. Le "An Out-of-Order Execution Technique for Runtime Binary Translators", ACM 1998 pp. 151-158.*

* cited by examiner

*Primary Examiner*—Tuan Q Dam
*Assistant Examiner*—Zheng Wei
(74) *Attorney, Agent, or Firm*—Blakely, Sokoloff, Taylor & Zafman LLP

(57) ABSTRACT

Selected regions of native instructions translated in a DBT environment from non-native instructions are compressed based on the independent compression of different fields of selected instructions using compression tables to reduce a length of selected fields. The regions of compressed instructions are stored and de-compressed into the native instructions during subsequent execution using de-compression tables. Specifically, for native instructions of a selected region, selected types of opcodes and/or operands may be compressed independently. The types may be selected by profiling the opcodes using benchmark programs and creating an opcode conversion table prior to compression, and scanning of the operands and creating an operand conversion table during compression of the opcodes.

25 Claims, 8 Drawing Sheets

COMPRESSING "WARM" CODE IN A DYNAMIC BINARY TRANSLATION ENVIRONMENT

BACKGROUND

1. Field

Dynamic binary translation of non-native code.

2. Background

A sequence of machine executable code or instructions, such as a computer program are typically written in a "language" such as an instruction set of a processor (e.g., part or all of the "machine"). A language may be all of the operations (jump, store, etc.) that a processor can or is able to perform. In other words, a single processor (embedded or otherwise) can usually only execute a given set of instructions (e.g., language). Normally, a program is developed in a higher-level language (e.g. C or C++) and then compiled to produce an executable file that will run on a target processor. If it is desired to run the program on a different processor, the higher-level language may be compiled with a different compiler to produce a different executable file for the second processor.

However, in some circumstances, the higher-level program may not be available; only the compiled program is available. In those circumstances, the compiled program, or regions of instructions thereof, may be either interpreted (the second processor emulates the original processor and calculates what the original processor would have done in response to each region of instruction) or translated (the region of instructions for the original processor are replaced with a region of instructions or instruction sequence that causes the second processor to perform the same operations that the original processor would have done). Typically, a program includes multiple "branches" or branch instructions delineating subroutines or "blocks" of instructions. A region of instructions may be one or more blocks of instructions. Thus, a region of instructions may be a sequence of one or more instructions or blocks of a program to be interpreted, translated, processed, and/or executed in succession in a dynamic binary translation (DBT) environment or by a dynamic binary translator.

For instance, in a DBT environment, a sequence of instructions or a computer program having instructions in one language (e.g., non-native instructions that can be executed or processed by a non-native machine or processor) may be "executed" or processed by a native machine or processor capable of processing another different language (e.g., such as a native processor for native instructions). Specifically, regions of instructions in the non-native language (e.g., "non-native" instructions) may be "dynamically" interpreted, and other regions may be translated into regions of instructions of the native language for processing by the native processor (e.g., such as by being compiled just-in-time during "execution" in the dynamic binary translation (DBT) environment).

Thus, compiled non-native instructions may be received in a DBT environment for processing by a processor other than the "non-native" processor for which they were compiled. Specifically, a DBT environment may exist where the non-native source code or higher-level program is not available (e.g., only the compiled non-native program is available). Also, a DBT environment may exist where a static compiler is unable to compile the non-native code into compiled native code. Next, a DBT environment may exist where, in a program or instruction sequence, regions of instructions are to be translated and regions of instructions are to be interpreted by a native processor. In this third case, a dynamic binary translator may cause some regions of non-native code instructions (e.g., instructions to control a processor capable of processing one type of code or language) to be translated to regions of native code instructions (e.g., instructions to control a different processor capable of processing a different type of code or language) and may cause other regions of instructions to be interpreted (e.g., the non-native instructions may be processed by the different processor). The goal of interpreting is to have the second processor emulate the original processor, calculate what task the original processor would have done in response to each region of instruction, and perform that task. The goal of translating is to replace the instructions the original processor is able to execute with instruction that the second processor is capable of executing.

For example, "hot regions" or hot code of a sequence of instruction may be small code regions of a program executed frequently at run time and all of the hot code may consume 90% of processor clocks (e.g., clocks of a central processing unit (CPU)) for processing the entire sequence. In a DBT environment non-native hot code regions may be "executed" by being translated into compiled native instructions "just-in-time" before execution or use by the native processor. The first time they are compiled, the non-native regions of hot instructions and the just-in-time compiled native regions of hot instructions are stored in a memory (e.g., in table or, code cache) for quick reuse to translate the non-native hot region to a native version next time that non-native region of instructions is encountered. However, this requires enough memory to store the non-native and the native regions of instructions in a memory/table for reuse. This memory requirement is tolerable because of the relatively high frequency of encountering or executing the regions of hot code and the relatively small portion or succession of the sequence that is the regions of hot code (e.g., it is more desirable to require more memory than to execute the hot code more slowly by using interpretation).

Correspondingly, "cold regions" or cold code in a sequence of instruction may be small code regions of a program executed infrequently at run time and consume few of processor clocks for processing the sequence. Thus, cold code or regions may be "executed" by being interpreted in a DBT environment. For instance, compiled non-native cold code regions can be interpreted into the functionality of native instructions during execution by the native processor. The extra time required to perform each interpretation is tolerable because of the relatively low frequency of encountering or executing the regions of cold code and the relatively large portion or succession of the sequence that is the regions of cold code (e.g., it is more desirable to require more time to interpret and less memory).

DETAILED DESCRIPTION

Figure 1:
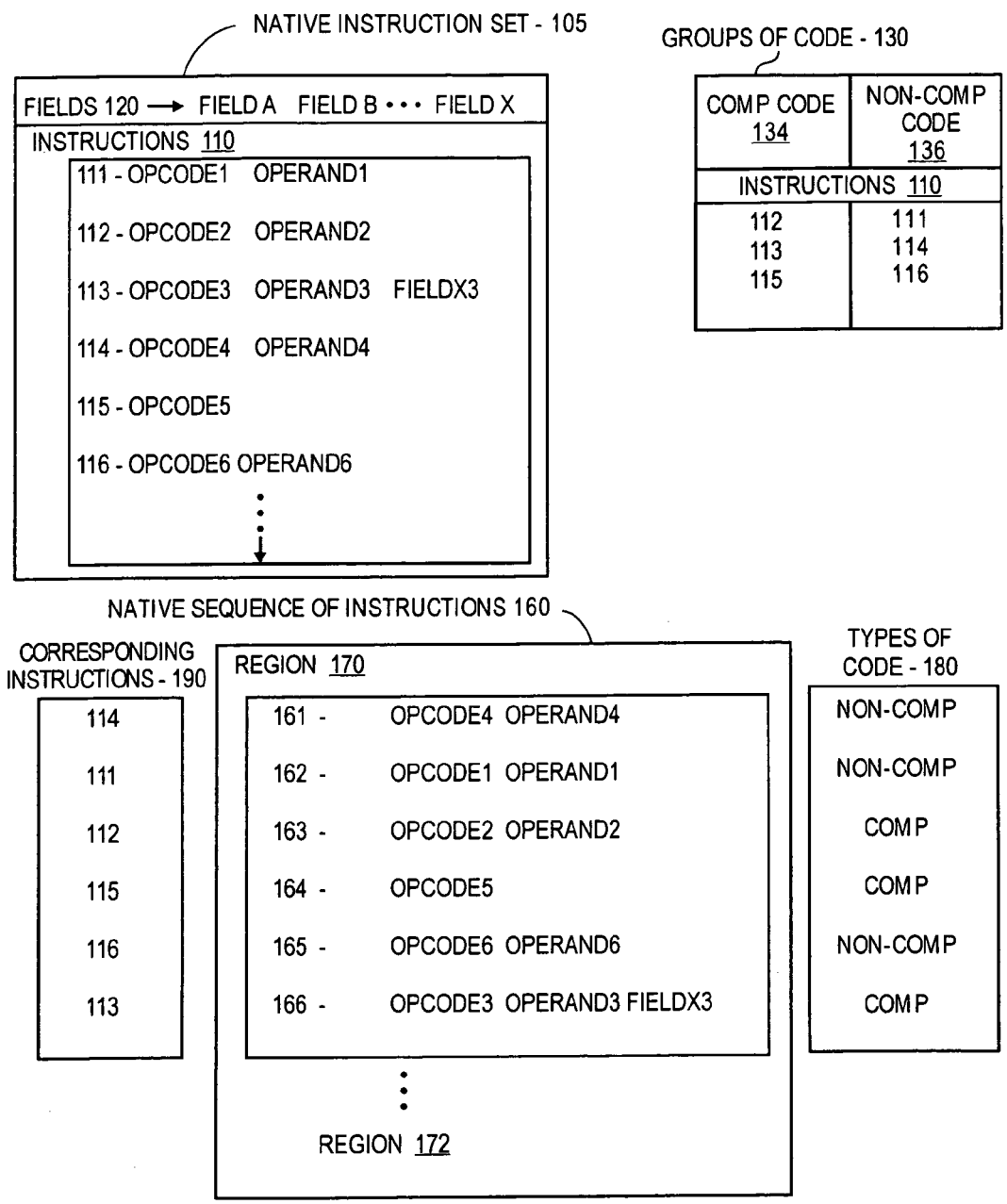
FIG. 1 shows instructions a native processor is capable of processing.

In a dynamic binary translation (DBT) environment, a sequence of instructions or a computer program having instructions in a non-native language (e.g., non-native instructions compiled into compiled non-native instructions) may be "translated" (e.g., dynamic binary "translation", not to be confused with translating "hot" code as described herein, which may be part of a dynamic binary "translation" process) to be "executed" or processed by a processor for another different or native language (e.g., a "native" processor, such as an embedded micro-processor). Such dynamic binary "translating" of non-native code may include "executing" some "cold" regions (e.g., cold code) of the non-native sequence of instructions by interpretation, and "executing" other "hot" regions (e.g., hot code) of the non-native sequence of instructions by translation. The interpreted and translated regions can then be "processed" by the native processor (such as by the native processor processing or executing the native code translated from the non-native code). Translating may include translating some or all of the non-native instructions, (e.g., compiled or un-compiled), into the native instructions (e.g., compiled or un-compiled), prior to processing by the native processor. A DBT environment may include dynamic binary "translation" of a sequence of non-native instructions, and/or an environment having a dynamic binary translator.

Moreover, according to embodiments, in a DBT environment, it may be desirable to dynamic binary "translate" certain regions of compiled non-native instructions that are other than hot or cold regions of instructions. For instance, some regions of the sequence of non-native instructions may be identified as "warm" regions (e.g., warm code), translated (e.g., similar to hot code translation), compressed, and then stored. When the warm regions are subsequently encountered (e.g., invoked, issued, dynamic binary "translated", "executed", processed, and/or appearing), the stored compressed code can be de-compressed to form native compiled code (like translated hot code) to be "processed" by the native processor. It can be appreciated that dynamic binary "translation" of a sequence of instructions in a DBT environment may include the "execution" of cold, warm and hot code regions of the sequence of instructions.

Warm regions (e.g., regions of "warm" code) of a sequence of instructions or program may be defined as regions of code or instructions of a program (e.g., regions of compiled native x86 instructions) executed semi-frequently at run time and consume 5-30% of processor or CPU clocks. If instead of being translated, compressed, stored, decompressed, and processed, the warm code is interpreted at run time (e.g., like "cold" regions), the warm regions of code can be stored without the need to store a translation (e.g., as required by hot code). However, the slow down of program execution due to the delay required to interpret to warm regions can be 70 times leading to increase of 3.5 times execution time for the entire program (e.g., such as for an entire sequence of instructions having 5% warm code). Alternatively, if instead of being translated and compressed, the warm code is translated and stored in code cache (e.g., like "hot" regions), the warm regions of code will take up a much greater amount of the cache than the hot code.

Hence, if regions of warm code can be properly dynamic binary "translated" in a DBT environment, execution performance (e.g., speed of "execution" and amount of memory required) will be improved. Specifically, the first time a region of warm code (e.g., non-native compiled code) is encountered, it may be "executed" by being identified (e.g., as a region of warm code, but not cold or hot code), translated (e.g., "just-in-time" compiled into native instructions), compressed into a compressed region of code, and the compressed region stored in a memory (e.g., code cache). The translated version of the code may be processed by the native processor, the first time the region of warm code is encountered. When the compressed region of code is re-encountered, it can then be de-compressed into the translated version of the code and processed by the native processor.

FIG. 1 shows instructions a processor is capable of processing. FIG. 1 shows native instruction set 105 such as an instruction set a processor can process. Set 105 may be a sequence of machine executable code or instructions, such as a computer "language" including all of the operations a processor (e.g., a type of processor, such as a processor capable of processing x86 instructions, x86 compiled instructions, assembly language, compiled assembly language, other compiled sets of instructions, or non-compiled higher-level language). FIG. 1 also shows groups of code 130 including code to be compressed COMP CODE 134, and code not to be compressed NON-COMP CODE 136. Groups of code 130 (e.g., COMP CODE 134, and NON-COMP CODE 136) may be considered groups, types, and/or subsets (e.g., see FIGS. 7 and 8) of a set of instructions (e.g., set 105). In addition, FIG. 1 shows native sequence of instructions 160, such as a computer program having instructions from one instruction set a native processor can process (e.g., set 105) or instructions in one "language," and types of code 180 for native sequence of instructions 160. Types of code 180 correspond to groups of code 130 on an instruction by instruction basis.

Native instruction set 105 may be a set of instructions used to generate sequences of instructions, such as a computer program to be "executed" or processed in a dynamic binary translation (DBT) environment by a native processor, as described above. Native instructions may be defined as instructions (e.g., a set of instructions such as set 105 or a sequence of instructions generated or produced using instructions of set 105 (e.g., see instructions 160) that one processor (e.g., a native processor) is capable of processing, although that processor may not be capable of executing another different set of instructions or language Native Instruction set 105 includes fields 120 having field A, field B, through field X. Fields 120 may include only one field, only two fields, only three fields, or any number of fields, such as where the number X is any number, such as a number equal to or greater than 100. For example, field A may be a field of an instruction that causes a processor to perform an operation or function (e.g., an opcode) and field B may be a field that includes information used when the processor performs the function or operation (e.g., an operand). Note that "opcodes" as used herein may be representative of operation codes of instructions, instructions, or other functional fields of instructions as know in the art. Moreover, "operands" as used herein may be representative of one or more operands that may be associated with each opcode including a full-length address, offset address, displacement address, absolute address, or other operand as known in the art. In addition, any or all of field A through field X may be a field having a constant of an instruction, and/or a constant length in the instruction. It is also contemplated that other fields of field 120 may include fields as described above with respect to field A and field B. It is considered that any instruction of set 105 may include any, all, or some of fields 120.

For example, FIG. 1 shows native instructions 110 of set 105 where field A is an opcode field, field B is an operand field, and field X is another field. Specifically, instructions 110 includes instructions 111, 112, 113, 114, 115, and 116. Instruction 111 includes opcode 1 and operand 1; instruction 112 includes opcode 2 and operand 2; instruction 113 includes opcode 3 and operand 3 and field X3; instruction 114 includes opcode 4 and operand 4; instruction 115 includes opcode 5 but no other field; and instruction 116 includes opcode 6 and operand 6. Moreover, instructions 110 may include instructions in addition to instructions 111 through 116.

Opcodes of instructions 110 may include various functions such as a "move", a "push", a "pop", a "call", a "test", a "je", a "jne", a "jmp", a "add", a "cmp", a "xor", a "ret", a "mov", a "inc", a "lea" (e.g., see Tables 1-3 below). Opcodes of instructions 110 may also include instructions to perform other logic functions, an instruction to perform other arithmetic functions, an instruction to perform other data combinations, an instruction to perform other data movement, an instruction to read or write data, an instruction to delete data, and/or various other functions as known in the art.

In addition, operands of instructions 110 may include various formats, various lengths, more than one operand, a full-length address, an offset address, a displacement address, an absolute address, a register operand, a push operand, a memory operand, a destination register, a long address, a long displacement, and/or other operands as known in the art. Thus, an instruction may have an opcode and one or more operands that correspond to that opcode. Moreover, opcodes and/or operands of a sequence or set of instructions can be divided, selected, identified, or assigned into groups, types, and/or subsets. For instance, certain ones of a sequence or set of instructions may be selected to be in a specific group or type of instructions (e.g., such as to be in COMP CODE 134, or NON-COMP CODE 136).

For example, groups of code 130 of FIG. 1 includes code to be compressed COMP CODE 134, and code not to be compressed NON-COMP CODE 136 that may each be considered a group, type, selection, or subset of instructions set 105. Specifically, FIG. 1 shows instructions of instructions 110 divided into groups of code 130. It is also contemplated that groups of code 130 may correspond to instructions of native sequence of instructions 160, such as is shown by types of code 180. Instructions 160 includes region 170 and region 172. Region 170 is shown having program counter values 161, 162, 163, 164, 165 and 166 for instructions of instructions 110 in region 170 (e.g., program counter values may be used by a program counter register in a computing device to point to memory or contain an addresses of memory containing an instruction of region 170). For instance, FIG. 1 shows corresponding instructions 190 listing which ones of instructions 111-116 of instructions 110 are in region 170. Corresponding instructions 190 lists which ones of instructions 111-116 correspond to instructions for program counter values 161 through 166. Code not to be compressed NON-COMP CODE 136 includes instructions 111, 114, and 116. Code to be compressed COMP CODE 134 includes instructions 112, 113, and 115.

Figure 2:
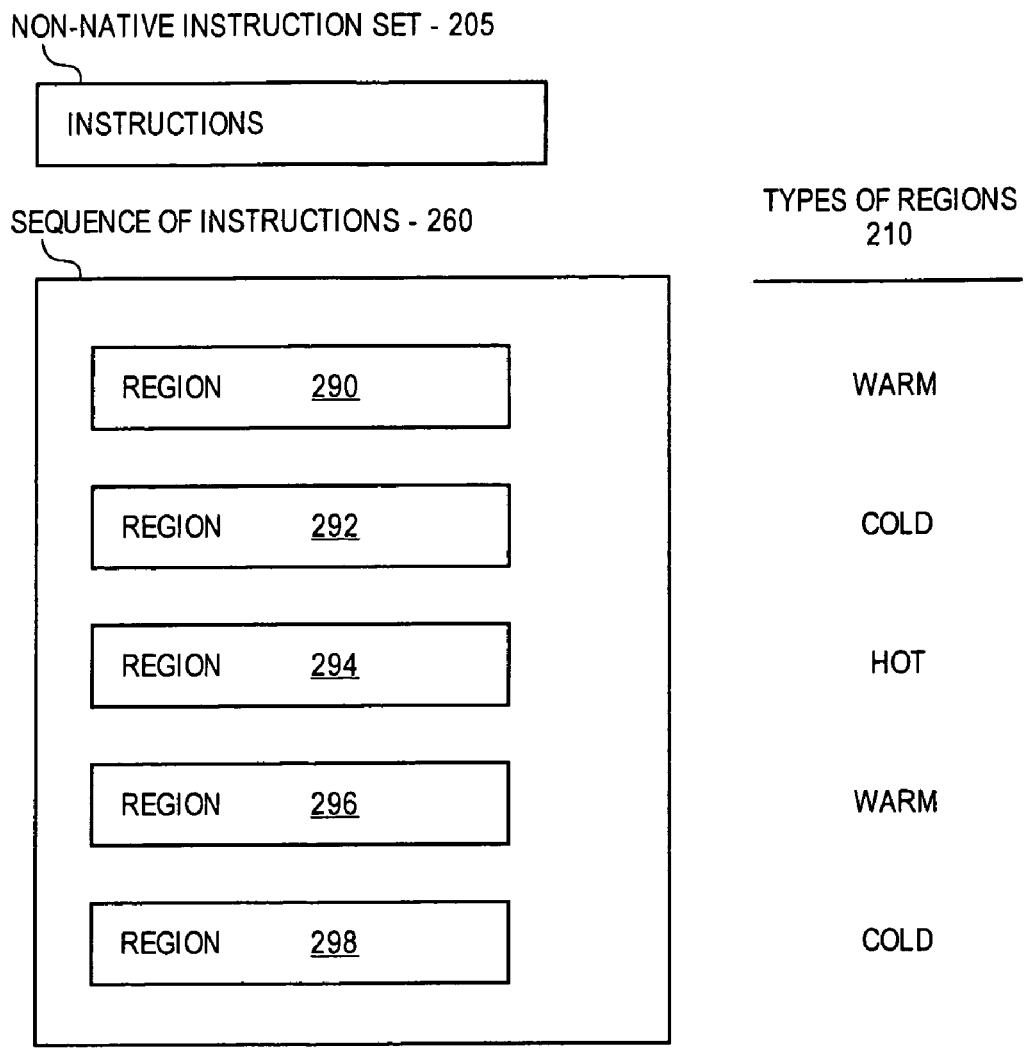
FIG. 2 shows a non-native instruction set and instructions a native processor is capable of processing in a DBT environment.

FIG. 2 shows a non-native instruction set and instructions a native processor is capable of processing in a DBT environment. FIG. 2 shows non-native instruction set 205 such as an instruction set a processor that is not the native processor capable of processing set 105, can process. Set 205 may be a sequence of machine executable code or instructions, such as a computer "language" including all of the operations a processor (e.g., a type of processor, such as a processor capable of processing code other than x86 instructions, or x86 compiled instructions).

In addition, FIG. 2 shows non-native sequence of instructions 260, such as a computer program having instructions from one instruction set a non-native processor can process (e.g., set 205) or instructions in one "language," and types of regions 210 for regions of non-native sequence of instructions 260. For instance, set 205 and instructions 260 may be a set, software program, or sequence of non-x86 instructions to be run on a non-native processor capable of executing instruction set 205, but unable to be executed by a native processor capable of executing instructions of set 105, without a DBT environment, a DBT, a translator, an interpreter, and/or by an embedded microprocessor.

Native instruction set 205 may be a set of instructions used to generate sequences of instructions (e.g., having one or more regions of hot, cold, and/or warm code), such as a computer program to be interpreted, translated, executed, and/or processed in a dynamic binary translation (DBT) environment. Moreover, set 205 may include instructions that are used to generate a sequence of native instructions translated via a dynamic binary translation on an embedded microprocessor from a sequence of non-native instructions. Non-native instructions may be defined as instructions (e.g., a set of instructions such as set 205 or a sequence of instructions generated or produced using instructions of set 205) that one processor is capable of processing, but that are to be executed or processed by another processor that is capable of processing a different set or sequence of instructions.

Moreover, depending on their opcode, instructions 260 may be grouped or divided into regions of code, regions of instructions, or regions of an instruction sequence. For example, the regions of instructions 210 may be divided into multiple "blocks" by one or more branch instructions delineating (e.g., separating, defining, or dividing) subroutines or "blocks" of instructions. In other words, the instructions or code between two branches or branch instructions may be described as a "block" of instructions. In some cases, a block of instructions may and/or be defined by (such as by having the beginning or end of the block at) a branch instruction jumping to a first or beginning instruction of the block (e.g., a branch instruction branching or pointing "into" the block). References to beginning, end, and next may refer to locations or position in a sequence of instructions, such as a sequence organized according to increasing program counter values, line numbers, instruction order in a sequence, and/or location in memory of instructions of the sequence of instructions). Also, a block of instructions may include and/or be defined by a branch instruction jumping away from a final or last instruction of the block (e.g., a branch instruction branching or pointing "out of" the block). Moreover, a block of instructions may include and/or be defined by a first or beginning instruction of the block that is the next instruction, after an instruction jumped to by a branch instruction. Finally, block of instructions may include and/or be defined by a first or beginning instruction of the block that is the next instruction, after an instruction jumped away from by a branch instruction. A region of instructions may be one or more blocks of instructions. In some cases, a "region" or a "region of instructions" may be a succession or sequence of one or more instructions or blocks of a program or of an instruction sequence to be interpreted, translated, processed, and/or executed in succession in a DBT environment or by a DBT.

For instance non-native sequence of instructions 260 includes region 290, region 292, region 294, region 296 and 298. Regions of instructions 260 may be or become different types of regions in a DBT environment, during translation by a DBT, during "execution" by a native processor, and/or during compression, as described herein. Types of regions 210 include hot code, warm code, and cold code that may each be a region of instructions 260. Specifically, types of regions 210 identifies region 290 as warm code, region 292 as cold code, region 294 as hot code, region 296 as warm code and 298 as cold code.

In some embodiments, instructions in hot code regions may be instructions or regions of instructions of a sequence of instructions (e.g., a computer program) that are executed frequently at run time and consume a majority of processor clocks during execution of the sequence. For example, instructions in hot code regions may consume 70%, 80%, 85%, 90%, 95%, 96% or 98% of the processor clocks when executing a sequence of instructions. Specifically, a region of non-native instructions 260 may be identified, selected, or determined as hot code during "execution" or translation of instructions 260 by a DBT or in a DBT environment, after being encountered 10, 20, 30, 40, 100, 200, 300, 400, 1000, 2000, 3000, 4000, 10000, 20000, any combination thereof, or any number therebetween of times. Corresponding, instructions of cold code regions may be instructions or regions of instructions of a sequence of instructions executed infrequently at run time and that consume few of the processor clocks when executing the sequence. Instructions in cold code regions may consume 2%, 3%, 5%, 7%, 10%, 15%, or 20% of the processor clock when executing a sequence of instructions. Specifically, a region of non-native instructions 260 may be identified, selected, or determined as cold code during "execution" or translation of instructions 260 by a DBT or in a DBT environment, if not encountered more than 1, 2, 3, 4, 10, 20, 30, 40, 100, 200, 300, 400, 1000, any combination thereof, or any number therebetween of times. Next, instructions in warm code regions for a sequence of instructions may be all or a subset of the instructions that are not included in hot code regions or cold code regions.

In some cases, warm code may be identified or selected as code or regions of code that it would take more memory than desired to process as hot code, such as by compiling just-in-time; and code that would take more time than desired if it were grouped with cold code, such as by being interpreted during execution. Instead, for warm code, a compaction or compression scheme as described herein may be used by a DBT, or in a DBT environment to more efficiently handle the warm code such as by balancing the memory necessary for the compaction scheme and the time necessary to de-compact or de-compress the compressed warm code.

Instructions in warm code regions may include instructions or regions of instructions executed semi-frequently during execution or processing of a sequence of instructions. For example, warm code regions may include instructions that consume 3%, 5%, 7%, 10%, 12%, 15%, 17%, 20%, 22%, 25%, 27%, 30%, 33%, 35%, 37%, 40%, or 50% of a processor's clocks when executing a sequence of instructions. Specifically, a region of non-native instructions 260 may be identified, selected, or determined as warm code during "execution" or translation of instructions 260 by a DBT or in a DBT environment, after being encountered 10, 20, 30, 40, 100, 200, 300, 400, any combination thereof, or any number therebetween of times. In some cases, a cold code region may become a warm code region after being encountered 5, 7, 8, 10, 15, or 20 times; and a warm or cold code region may become a hot code region after being encountered 50, 70, 80, 100, 120, 150, or 200 times. Sometimes, cold code regions may become warm code regions after being encountered 10 times, and cold or warm code regions may become hot code regions after being encountered 100 times.

Sometimes, warm code regions may be selected as the next most frequent instructions or regions encountered in one set of instructions, other than the hot code regions, according to one or more programs or sequences of instructions. In some embodiments, the length of execution time required to execute an instruction or field (e.g., an opcode) or a region of instructions or fields may or may not be a factor to determine warm code regions.

As noted, if regions of warm code can be properly identified and "executed" in a DBT environment, execution performance can be improved. Specifically, the first time a region of warm code is encountered, it may be "executed" by being identified, translated (e.g., "just-in-time" compiled into native instructions), compressed into a compressed region of code, and the compressed region stored in a memory (e.g., code cache). The translated version of the code may be processed by the native processor, the first time the region of warm code is encountered.

When the compressed region of code is re-encountered, it can then be de-compressed into the translated version of the code and processed by the native processor. One or more tables stored in a memory (e.g., other than the code cache) may be used to assign compression codes the warm code for compression (e.g., compression tables), and to decompress the compressed code back to native compiled code during de-compression (e.g., de-compression tables).

According to some embodiments, the first time the region of warm code is encountered, the compressed region stored in a memory (e.g., code cache) may be de-compressed into the translated version of the code and processed by the native processor. In other words, in these embodiments, the same process above for re-encountering the compressed region may be performed to process the code, the first time the region of warm code is encountered.

The compressed code stored in a memory allows for quick reuse of the region by the processor. However, this requires enough memory to store the compression tables, the de-compression tables, and the compressed warm code regions. In some cases all or a portion of the compression and de-compression tables are permanently stored in the native processor for reuse during execution of multiple programs or sequences in the DBT environment, while the compressed warm code regions are stored for reuse only during "execution" of one sequence of non-native instructions in the DBT environment.

This memory requirement is tolerable because of the higher frequency of encountering or "executing" the regions of warm code (e.g., as compared to cold code) and the relatively small portion or succession of the sequence that is the regions of warm code (e.g., as compared to hot code). In other words, for warm code, it is more desirable to require more memory (compression and de-compression tables, and storage of compressed translated warm code regions) than for cold code (none of the warm code memory requirements), but less than for hot code (storage of uncompressed translated hot code regions); and to "execute" faster than interpreting for cold code, but slower than translating for hot code (because unlike the uncompressed translated hot code regions, the compressed translated warm code regions must be de-compressed prior to processing when re-encountered). More information about assigning codes and compression tables, is discussed below in conjunction with FIG. 4.

In FIG. 1, native sequence of instructions 160 is shown having region 170 through region 172, such as regions of instruction including one or more instructions in each region. Regions 170 and 172 may correspond to regions 290 and 292, respectively, of FIG. 2. Thus, region 170 may be warm code, to be just-in-time (JIT) compiled into native compiled code and compressed, then de-compressed for processing by a native processor in a DBT environment. Alternatively, region 172 may be cold code, to be interpreted by a native processor in a DBT environment.

Specifically, FIG. 1 shows region 170 including instructions for program counter values 161, 162, 163, 164, 165 and 166. The instruction for program counter value 161 includes opcode 4 and operand 4. The instruction for program counter value 162 includes opcode 1 and operand 1. The instruction for program counter value 163 includes opcode 2 and operand 2. Also, the instruction for program counter value 164 includes opcode 5. Next, the instruction for program counter value 165 includes opcode 6 and operand 6. Finally, the instruction for program counter value 166 includes opcode 3, operand 3, and field X3. FIG. 1 also shows corresponding instructions 190 listing the instructions of instructions 110 corresponding to instructions for program counter values 161 through 166. Thus, region 170 may include one or more of the instructions of set 105 and may include more than one of each of the instructions included in set 105. Specifically, where set 105 is a set of x86 instructions that a native processor is able to execute, sequence of instructions 160 may be a software program or sequence of the x86 instructions to be run on a native processor capable of executing instruction set 105. Note that although instructions for program counter values 161 through 166 include the opcodes and operands from instructions 110, the particular opcodes and operands of region 170 may vary from those of instructions 110 as required by the specific functionality desired of sequence of instructions 160. For instance, where operands of instructions 110 may be generic or representative of types of addressing, operands of instructions 160 may include specific addresses. Thus, instructions of region 170 may be identified as part of a subset or group, such as those identified or groups of code 130.

More particularly, region 170 is a warm code region and includes code to be compressed, and code not to be compressed. For instance, FIG. 1 shows types of code 180 indicating to which instructions for program counter values 161 through 166 are to be compressed. Code to be compressed (e.g., corresponding to COMP CODE 134) includes instructions 112, 115, and 113 corresponding to instructions for program counter values 163, 164, and 166. Alternatively, code not to be compressed (e.g., corresponding to NON-COMP CODE 136) includes instructions 114, 111, and 116 corresponding to instructions for program counter values 161, 162 and 165.

According to some embodiments, code not to be compressed NON-COMP CODE 136, may be translated code or may be interpreted. Specifically, while code to be compressed COMP CODE 134 may be compressed translated compiled code (e.g., compiled from non-native code), code not to be compressed NON-COMP CODE 136 may be translated compiled code (e.g., compiled from non-native code) that is not compressed (e.g., it may be similar to the same translated instruction for hot code). Thus, during execution in a DBT environment, instructions for program counter values 161, 162, and 165 may be translated compiled instructions (e.g., compiled just-in-time like hot code). On the other hand, instructions for program counter values 163, 164, and 166 may be translated compiled instructions (e.g., compiled just-in-time like hot code) that then has one or more fields of compressed information. During processing by the native processor, instructions for program counter values 161, 162, and 165 may be processed as they are (e.g., compiled just-in-time like hot code), but instructions for program counter values 163, 164, and 166 must be de-compressed into compiled native code (e.g., into just-in-time compiled code like hot code) for processing.

Selection of code to be compressed COMP CODE 134 and code not to be compressed NON-COMP CODE 136 of groups of code 130 and types of code 180, may include using domain specific knowledge as well as other factors. More information about analyzing instruction sets and assigning codes and instructions to groups, is discussed below in conjunction with FIG. 4.

Figure 3:
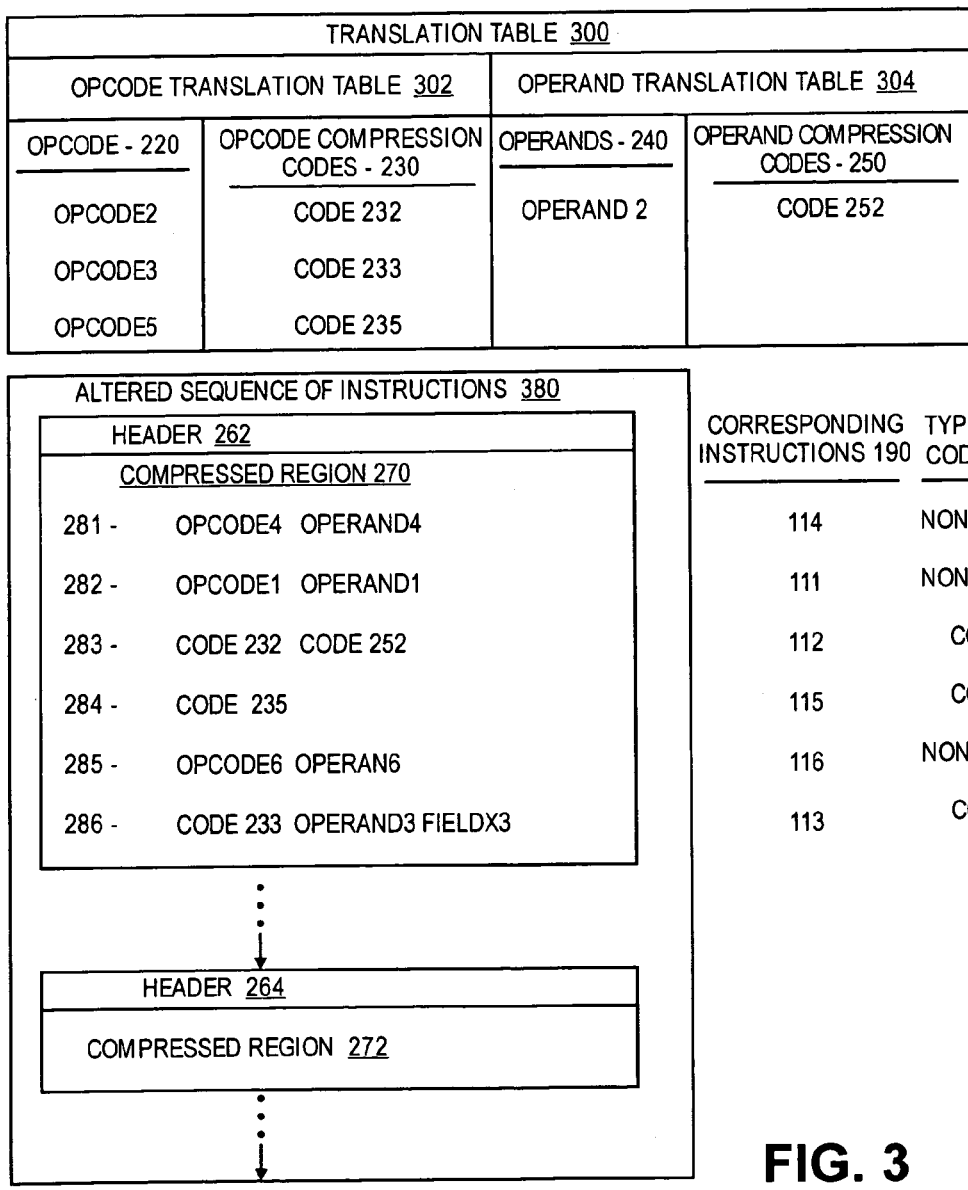
FIG. 3 shows a compression table for compressing opcodes and operands, and an altered sequence of instructions including compressed opcodes and operands.

As noted, fields of code to be compressed (e.g., instructions of a region of warm code) may be separated and coded or compressed independently, such as using separate compression processes. For example, FIG. 3 shows a compression table for compressing opcodes and operands. FIG. 3 also shows an altered sequence of instructions including compressed opcodes and operands. FIG. 3 shows compression table 300 including opcode compression table 302 for translating opcodes of an instruction, and operand compression table 304 for translating or compression operands of an instruction. Table 302 includes opcodes 220 and opcode compression codes 230. Similarly, table 304 includes operands 240 and operand compression codes 250. Opcodes 220 include opcodes 2, 3, and 5. Corresponding to opcodes 220, codes 230 includes code 232 corresponding to opcodes 2, code 233 corresponding to opcode 3, and code 235 corresponding to opcode 5. Similarly, operands 240 includes operand 2 and codes 250 includes code 252 corresponding to operand 2. Thus, a first compression process, coding, type of code, or time at which compression codes are generated may be selected for table 302 as compared to table 304. For example, codes 230 of table 302 may be identified for an instruction set, plurality of sequence of instructions, sequence of instructions, or region of instructions prior to "executing" or translating the non-native instructions in a DBT. Codes 250 of table 304 may be determined after translation or JIT compiling of the non-native code into native code has already begun. It is also considered that codes 250 may be determined prior to "executing" or translating, as described above for codes 230. Compression of instructions or fields during "execution" or translation in a DBT environment may be described as "dynamically" compressing instructions, or fields thereof.

Table 302 may be constructed prior to or during compiling of non-native instructions in a DBT environment. Constructing a table may include generating, assigning, selecting, identifying and/or creating entries (e.g., instructions, opcodes and/or operands to be compressed, such as those of COMP CODE 134 of groups 130 and/or COMP of types 180) and corresponding compression codes (e.g., as described below for FIG. 4). Table 302 may also be constructed prior to JIT compiling, translating, "executing", processing, and/or compressing a sequence or a region of native compiled instructions in a DBT environment. Table 304 may be constructed prior to or during JIT compiling, translating, "executing", processing, and/or compression of a sequence or a region of native compiled instructions in a DBT environment. For example, the tables (e.g., instructions, opcodes, operands, and/or compression codes) may created or assigned by a programmer, a person, a user, another computer program, a computer, or a machine that is or is not part of the DBT environment, such as prior to fixing table 302 or table 304 in a medium or memory. In some cases, compression codes (e.g., tables 202 and/or 204) may be predetermined using dynamic profiling to identify code to be compressed in warm code regions prior to JIT compiling a region (or translating a sequence) of non-native instructions. Thus, the code to be compressed may be selected and the compression codes and tables may be constructed to be used by a device, software program, or other sequence of instructions to alter a sequence of non-native code at a subsequent time by replacing fields, such as opcodes and operands, of the native code with the compression code assigned to each field. An example of a flow diagram showing a process for constructing a table to compress sequences of instructions is discussed below in conjunction with FIG. 4.

Figure 4:
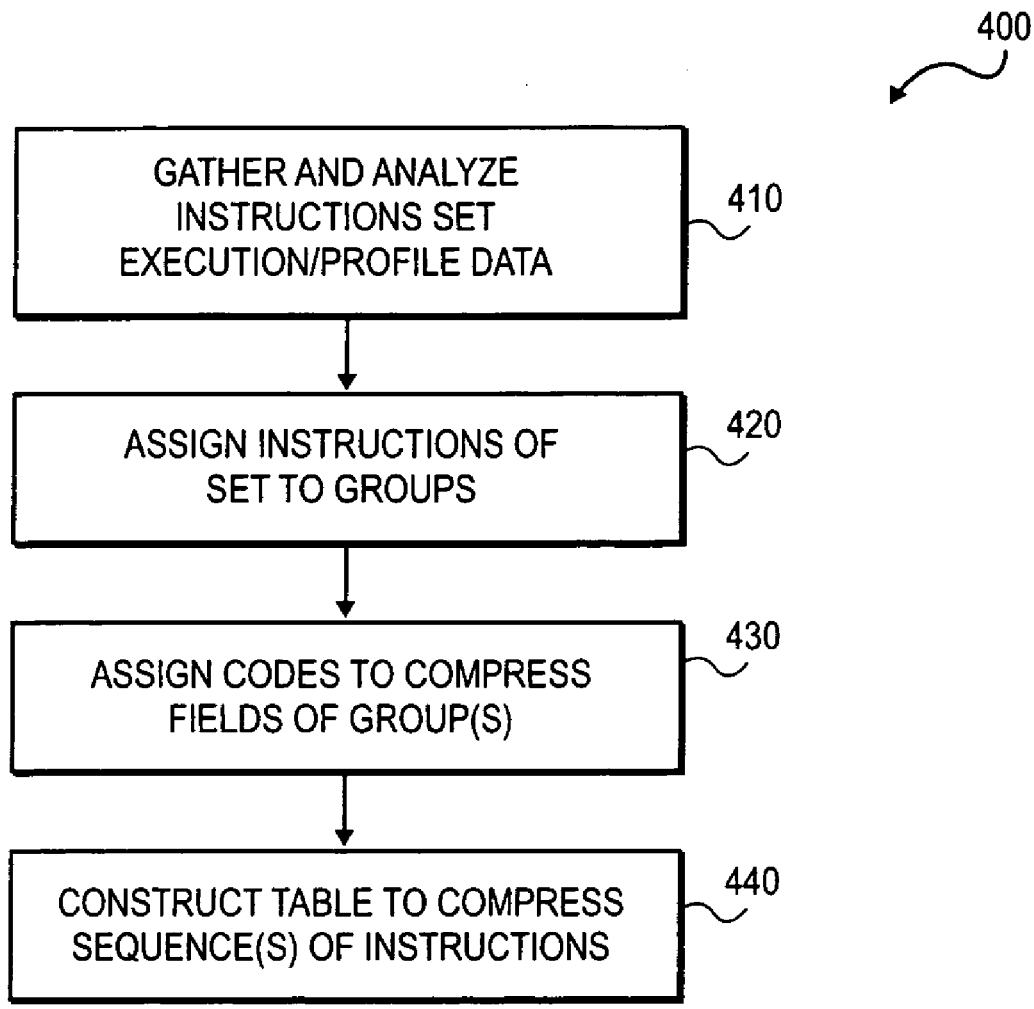
FIG. 4 is a flow diagram showing a process for constructing a table to compress sequences of instructions.

With respect to FIG. 3, selecting opcodes 220 and operands 240 may also include profiling and execution considerations as described herein (e.g., see FIG. 4). Selecting opcodes 220 may include selecting a set of opcodes that appear most frequently or that consume most of the clocks in sequences of instructions (e.g., such as benchmarks). For instance, when compressing a region of warm code, instructions 283, 284, and 286 may be selected to be compressed and appended as compressed code to the JIT compiled hot code and/or cold code. In some cases, instructions 283, 284, and 286 may be 3 instructions among 16 selected instructions of a set of native instructions or opcodes (e.g., of set 105) to be compressed and appended as compressed code, to the JIT compiled hot code and/or cold code. For example, 4 bit uniform code length compression codes may be used to substitute in for, compress, or replace opcodes, fields, or instructions of native JIT compiled code instructions 283, 284, and 286. An example of compressing opcodes is given below in the section Compressing Opcodes.

Moreover, selecting operands 240 may include selecting operands having a full length address, a long address, or a long displacement. In addition, selecting codes 250 may include selecting a 4 byte uniform length code providing base relative displacement according to a base address. Also, considerations for creating table 304 may include creating one or more "displacement tables" to exist in table 304, due to the length of the operands to use base relative displacement so all displacements are non-negative, to use multilevel displacement so that different instruction types can have separate displacement tables, to have a separate displacement table for each opcode or each sequence of instructions, and/or to set a base address to begin positioning of a program. An example of compressing operands is given below in the section Compressing Operand Long Addresses.

It is also contemplated that table 302 and table 304 may be stored together, or separately, in the same, or separate storage locations or memories, such as random access memory (RAM), read only memory (ROM), software, machine executable instructions, media, optical media, magnetic media, or other information storage devices or processes.

FIG. 3 also shows an altered sequence of instructions 380 including compressed opcodes and operands. Altered sequence of instructions 380, may be a sequence of instructions including compressed instruction regions having compressed instructions or fields thereof. Specifically, instructions 380 includes header 262 for compressed region 270, and header 264 for region 272. Regions 270 and 272 may correspond to regions 170 and 172, respectively, of FIG. 1, and/or regions 180 and 182, respectively, of FIG. 2. Thus, region 270 may be warm code, JIT compiled into native compiled code and compressed, that may then be de-compressed for processing by a native processor in a DBT environment. Alternatively, region 272 may be cold code, to be interpreted by a native processor in a DBT environment. Header 262 and 264 may be inserted at the beginning of regions 270 and 272 to indicate that those regions have been compressed. The headers can be bit sequences that do not represent any legal instruction and may be followed by a bitmap in which each bit corresponds to an instruction in the corresponding region and indicates whether the corresponding instruction is compressed. For example, header 262 may be followed by a bit map having a bit corresponding to instruction 281 indicating that that instruction is not compressed, a second bit corresponding to instruction 282 indicating that that instruction is not compressed, a third bit corresponding to instruction 283 indicating that that instruction is compressed, a fourth bit corresponding to instruction 284 indicating that that instruction is compressed, a fifth bit corresponding to instruction 285 indicating that that instruction is not compressed, and a bit corresponding to instruction 286 indicating that that instruction is compressed. If a code region is not compressed, then the header and bit map may be absent. Compressed region 270 includes instructions 281, 282, 283, 284, 285, and 286.

FIG. 3 also shows corresponding instructions 190, which identify ones of instructions 110 corresponding to instructions 281 through 286. Likewise, FIG. 3 shows types of code 180 for instructions 281 through 286. Thus, after altering region 170 of sequence of instructions 160 to compact, encode, code, compress, create, or form compress region 270 of instructions 380, instructions 283, 284 and 286 which are code to be compressed, are compressed. As shown, instruction 281 includes opcode 4 and operand 4, such as non-compressed native JIT compiled code. Instruction 282 includes opcode 1 and operand 1, and instruction 285 includes opcode 6 and operand 6, such as non-compressed native JIT compiled code. Alternatively, instruction 283 includes code 232 in place of, or as a compression of opcode 2; and code 252 in place of or as a compression of operand 2. For example, code 232 may include a 4 bit uniform code length code, and code 252 may be a 4 byte uniform length code. Similarly, instruction 284 includes code 235 instead of, or as a compression of opcode 5. Next, instruction 286 includes code 233 in place of or as a compression of opcode 3, operand 3, and field X3. For example, instruction 286 represents an instance where although opcode 3 has been compressed to code 233, operand 3 has not been compressed. As shown, instructions 283, 284 and 286 includes codes 232, 252, 235, and 233, such as compression codes for native JIT compiled codes. Thus, region 170 may be compressed into compressed region 270 according to table 300.

FIG. 4 is a flow diagram showing a process for constructing a table to compress sequences of instructions. FIG. 4 may be a process to construct tables such as compression table 300 of FIG. 3. FIG. 4 shows process 400 including block 410 where execution and/or profile data is gathered and analyzed for a native instruction set. Block 410 may include gathering and analyzing execution and profile data as described above. Moreover, block 410 may include considering whether a specific compiled native instruction or a specific native sequence of compiled instructions is to be executed by a native processor.

Next, at block 420, instructions of an instruction set are assigned to groups. Block 420 may correspond to assigning instructions of a set of instructions a processor can process to code to be compressed and code not to be compressed groups, or groups of code 130. It is also contemplated that block 420 may include assigning instructions to only one group, such as code to be compressed as described herein.

At block 430, codes are assigned to compress fields of the code to be compressed group. For example, block 430 may correspond to assigning compression codes to fields of instructions, such as opcodes and operands, as described above. Next, at block 440, a table to compress sequences of instructions is constructed. For example, block 440 may correspond to constructing one or more tables (e.g., table 302) to compress one or more fields of one or more instructions or regions of instructions of one or more sequences of instructions.

Various factors may be considered when performing blocks 410-440. For instance one or more tables (e.g., from block 440) may require storage in a memory (e.g., other than the code cache) to assign compression codes the warm code for compression (e.g., compression tables), and to decompress the compressed code back to native compiled code during de-compression (e.g., de-compression tables). Also, the compressed version of a warm code region may require storage in memory, prior to de-compression back into compiled native instructions during "execution".

For example, selection of code to be compressed COMP CODE 134 and code not to be compressed NON-COMP CODE 136 of groups of code 130 and types of code 180, of FIGS. 1 and 3 may include using domain specific knowledge such as characteristics of a particular machine language or set of instructions a native processor can process (e.g., set 105). Also, code to be compressed COMP CODE 134 and code not to be compressed NON-COMP CODE 136 may be selected considering various factors including data from dynamic profiling, domain specific knowledge, memory size required, execution speed required, total execution time required, frequency of appearance of an instruction or field thereof (e.g., an opcode and/or operand), size of an instruction or field, number of occurrences of an instruction including certain fields in a sequence of instructions translated in a DBT environment. Furthermore, the above factors may be considered for regions of the sequence, and/or for a number of sequences of instructions (e.g., such as a test, analysis, or benchmark analyzing or providing analysis for more than one computer program), of a native instruction set a processor can process. Moreover, such determination may include a comparative analysis with respect to the other fields and instructions of a sequence and/or set of instruction, the other types fields and instructions of a sequence and/or set of instructions, and/or other factors of a DBT environment, and may include similar considerations as known in the art. Sometimes, the code to be compressed COMP CODE 134 and code not to be compressed NON-COMP CODE 136 instructions may be selected as the most frequent instructions or regions of one or more sets of instructions, according to one or more benchmark programs, or according to many sequences of instructions analyzed. Specifically such factors for selecting opcodes 220 may include selecting a set of opcodes that appear most frequently or that consume most of the clocks in sequences of instructions (e.g., such as benchmarks). In some embodiments, the length of execution time required to execute an instruction or field (e.g., an opcode) or a region of instructions or fields may or may not be a factor to determine code to be compressed COMP CODE 134 and code not to be compressed NON-COMP CODE 136.

Also, selection of code to be compressed COMP CODE 134 and code not to be compressed NON-COMP CODE 136 can take into account a balance between factors, such as the amount of memory necessary to store the compression tables (e.g., memory for compression tables to compress native JIT compiled code into compression code), and the processing time necessary to perform de-compression (e.g., time necessary using identification or decompression tables to identify and de-compress the compressed codes). Such compression may also consider factors involved (e.g., time and memory required) for translating "hot" code (e.g., via just-in-time compiling), and factors involved (e.g., time and memory required) for interpreting "cold" code. For example, factors related to "hot" code and/or "cold" code DBT translation can be dynamically profiled and analyzed to select, identify, or predetermine JIT compiled native code to be compressed of "warm" code regions of a sequence of instructions (e.g., software program) prior to JIT compiling the warm code regions. The region may then be JIT compiled into native compiled code and compressed. In particular, after JIT compiling, a "warm" code region, that region may be altered or compressed using the compression table having codes assigned to one or more fields of each instruction of the "warm" code. Alternatively, "cold" regions may be interpreted during execution, and the "hot" regions may be JIT compiled and not compressed during execution.

Once the code to be compressed is selected or identified (e.g., as group COMP CODE 134 of FIG. 1), a compression code may be assigned to each of the instructions, or one or more fields thereof. In embodiments, fields of the code or instructions to be compressed may be separated and coded or compressed separately or independently, such as using separate compression processes. In some cases, the compression code may be selected to compress opcodes, instructions, fields, compiled code, or executable code more efficiently than a general purpose compressor (e.g., more efficiently than Lempel-Ziv, or Huffman coding), such as by using a uniform length code to compress opcodes, operands, and/or other fields of an instruction. Moreover, the compression code can be selected considering a static inventory of instructions of a program or sequence of instructions, or a static inventory of an instruction set a processor can process.

For instance, profiling (e.g., dynamic profiling; and/or gathering and analysis of execution data for one or more programs, test data, benchmark data, etc. which may include such data or processes, as know in the art), analysis may be used to select fields of a language (e.g., set of instructions a processor is able to process or execute) to compress, and to assign compression codes therefore. Appropriate ways to perform such profiling, analysis, selection, and/or assignment may include automated methods (e.g., such as where a computer performs profiling analysis, selection and generates the codes). It is also considered that a person may perform the profiling, analysis, selection and/or assignment, such as using a manual, machine assisted, or computer assisted process. Thus, a completely automated system (e.g., without human intervention after setup), manual system, or mixture thereof can be used to profile, analyze, select and/or assign, by considering test, benchmark, and other data for a native language of a processor before a specific non-native program including that language is compiled or compressed in a DBT environment.

In some cases, the compression code may be a uniform length code, such as a code having two bits, four bits, six bits, eight bits, 12 bits, 16 bits, 20 bits, 32 bits, or n-bits where the number of instructions selected as code to be compressed is $2^{(n)}$ instructions. A sufficient number of instructions selected for code to be compressed may be 4, 6, 8, 10, 12, 14, 16, 18, 20, 32, 64, 128, 256, 512, 1024, 2048, or a combination thereof of instructions. In some cases, the number of instructions selected for code to be compressed may be 16 instructions the compression code for opcodes of the selected instructions may each be a 4 bit code, and the compression code for a subset of operands of the selected instructions may each be a 4 byte code. Instructions may have compression code to compress each opcode into a 4 bit code, and to compress each of one or more operands of some opcodes into 4 byte codes or operand address (the operand compressions may be selected while "executing" the non-native program in the DBT environment).

For instance, according to some compression techniques, a pattern of or in a region of warm code may be compressed using a pattern substitution coding format where a text or character pattern is compressed using a pattern table containing a set of distinct patterns and their corresponding function values. Each function value is a special compression indicator character (code) which represents the compressed valued of a particular argument. Appropriate coding or compression may include or have a goal of compressing each pattern to a total code length that is "minimized". Also, at de-compression time, the code may be used as an index into an identification or de-compression table, such that the corresponding pattern (e.g., the pattern compressed), or a different pattern is retrieved.

Compression techniques or systems considered include universal loss-less data compression, speed of compression (e.g., speed to perform pattern substitution), speed of de-compression, complexity of compression (e.g., how simple the pattern is for substitution), complexity of de-compression, and compression factor for regions, instructions, or fields of instructions of code to be compressed.

For instance, in a DBT environment, compression may be based on the independent compression of different fields of code to be compressed using compression tables, each having a goal of compression of an instruction or of a field of an instruction to a total code length that is "minimized" for storage and then de-compressed using de-compression tables. Also, compression may be based on the independent compression of different fields of code to be compressed using compression tables, each having a goal of compressing one or more regions of instructions to a total code length that is "minimized" for storage and then de-compressed. Moreover, factors involved in compression may include considering the design of the instructions to be compressed (e.g., design or sequence of code, data, or digits in the fields of instructions) and/or the frequency of appearance, encounter, invoking, issue of the instructions relative to each other in benchmark programs (e.g., see Table 1 below). Specifically, for an x86 instruction or an assembly instruction (e.g., "pattern") opcodes and operands may be compressed, coded, encoded separately, independently or via independent compression predetermined by profiling of the opcodes and operands.

Thus, opcodes and operands of regions of compiled native code (e.g. regions selected as "warm" code) may be compressed and stored so that during execution the compressed code may be de-compressed, such as using de-compression tables, into a region of native compiled code more quickly than re-translation of the region (e.g., re-JIT compiling). Moreover, storage of the compressed warm code region, such as in a memory, will take less space, size, or storage resources than it would for an uncompressed version of the warm code region (e.g., less than the JIT compiled version prior to compression). Specifically, according to embodiments, warm code may be compressed, compacted, coded, or encoded into a smaller size or smaller region so that it takes less memory (e.g., less memory than it would to store the hot code compiled just-in-time data) when stored.

Figure 5:
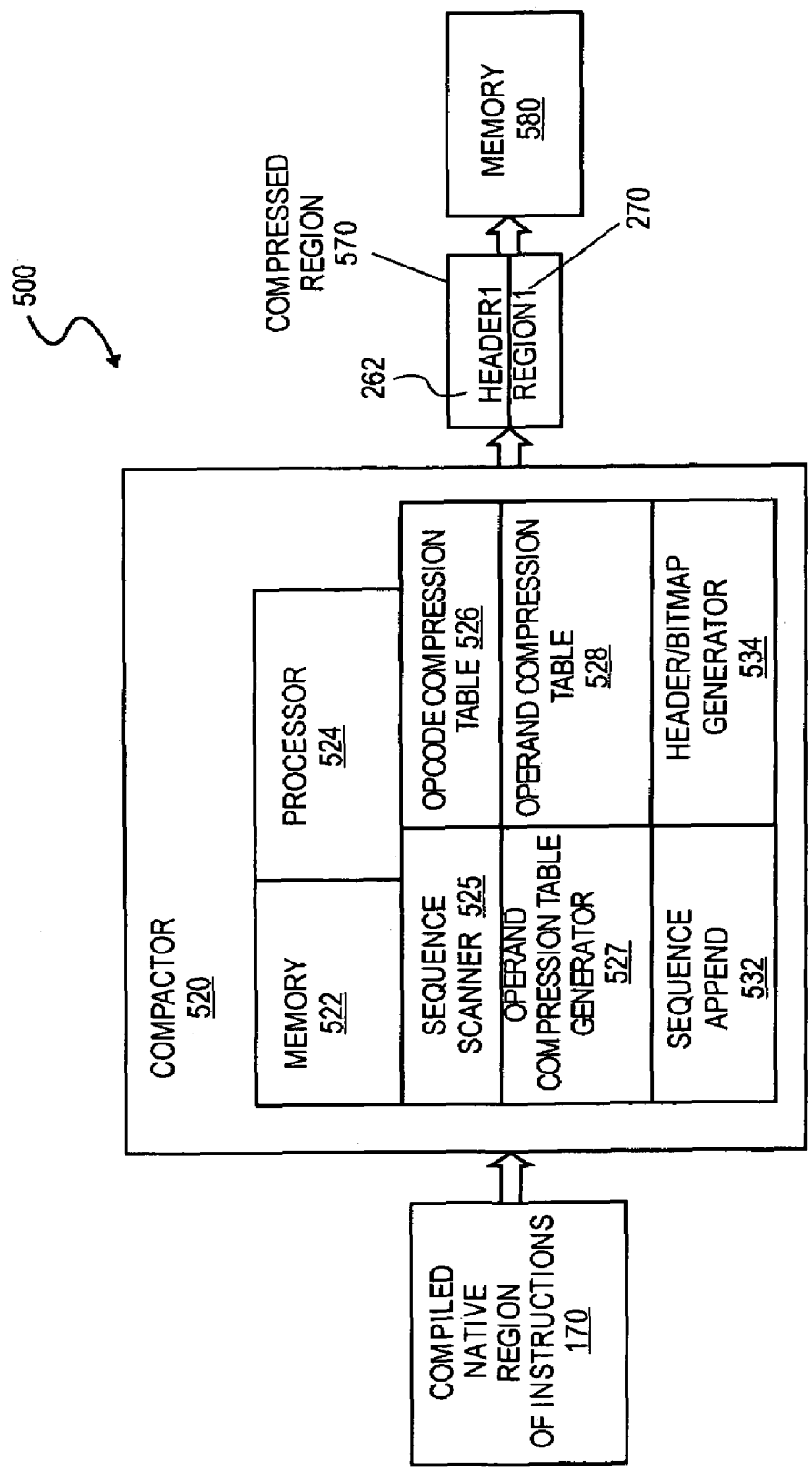
FIG. 5 is a block diagram of a compactor.

FIG. 5 is a block diagram of a compactor to compress and/or compact code. FIG. 5 shows environment 500 including compiled native region of instructions 170 (e.g., such as a region of warm code JIT compiled from non-native code) input into compactor 520 and compressed region 570 output by compactor 520 to be stored in memory 580. Compactor 520 includes memory 522 and processor 524. For example, memory 522 may store a set of instructions (e.g., instructions accessed, loaded, or read from a machine readable medium) that when executed by processor 524, causes compactor 520 to compress instructions of region 170 into region 570, such as according to FIGS. 3, 5, 7, and/or otherwise as described herein. Process 500 may occur during compiling, JIT compiling, scanning, translating, "executing", and/or compacting of a region of warm code instructions.

Compactor 520 also includes sequence scanner 525, such as to scan instructions 170 to determine whether instructions or regions of instructions thereof may be compressed. Compactor 520 also includes opcode compression table 526 such as a table to compress opcodes like table 302. Compactor 520 also includes operand compression table 528, such as a table to compress operand like table 304.

In addition, compactor 520 includes operand compression table generator 527, such as a generator for generating table 528 during scanning, translating, JIT compiling, or during compacting of instructions 170. Thus, instructions 170 may be scanned by scanner 525 and operands thereof may be identified (e.g., such as long addresses) to build table 528. Alternatively, table 526 may be preexisting, such as by being generated considering an instruction set a processor can process prior to compacting instructions 170 with compactor 520.

Figure 7:
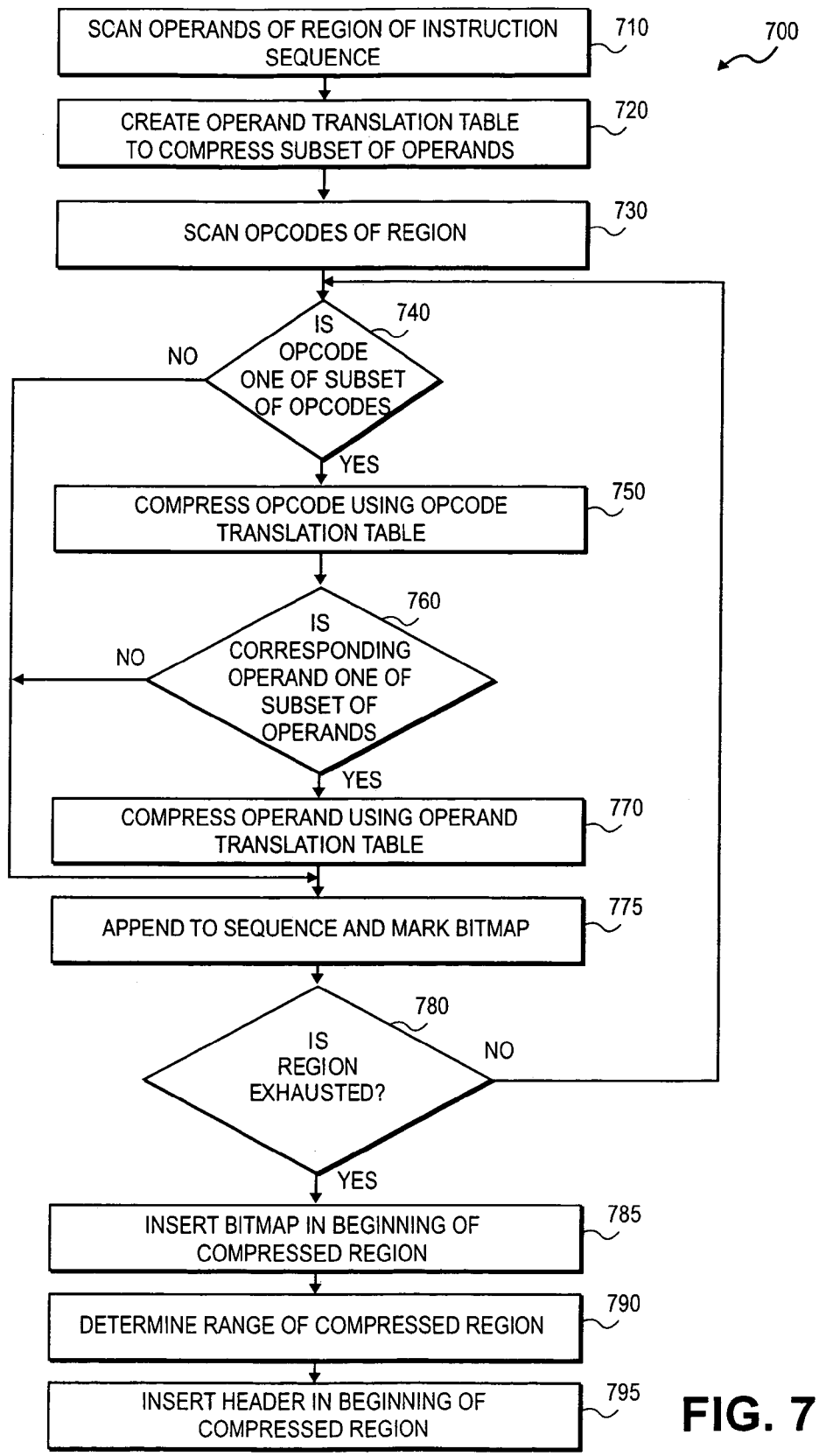
FIG. 7 is a flow diagram showing a process for compressing a region of an instruction sequence.

Compactor 520 also includes sequence appender 532, such as an appender to append compressed opcodes and operands to a region of instructions (e.g., region 170 prior to compression and region 570 after completion of compression, as described for process 700 of FIG. 7) to create compressed region 570. Also, compactor 520 includes header/bitmap generator 534, such as a generator to generate headers and bitmaps to create region 570, such as a compressed region, header, and bit maps as described above with respect to FIG. 3 and region 270, header 262, and a corresponding bit map to a compressed region. Moreover, header/bitmap generator 534 may insert bitmaps and headers as described below with respect to blocks 785 and 795 of FIG. 7.

FIG. 5 shows compressed region 570 including region 1 and corresponding header for region 1, header 1. Headers and regions of region 570 may be compressed regions and headers therefore as described herein. For example, header 1 may correspond to header 262 as described with respect to FIG. 3, and region 1 may correspond to compressed region 270 as described above with respect to FIG. 3. Also, region 1, header 1 may represent a number of adjacent or un-adjacent warm code regions of a sequence of instructions. FIG. 5 also shows memory 580, such as a memory for storing region 570.

Figure 6:
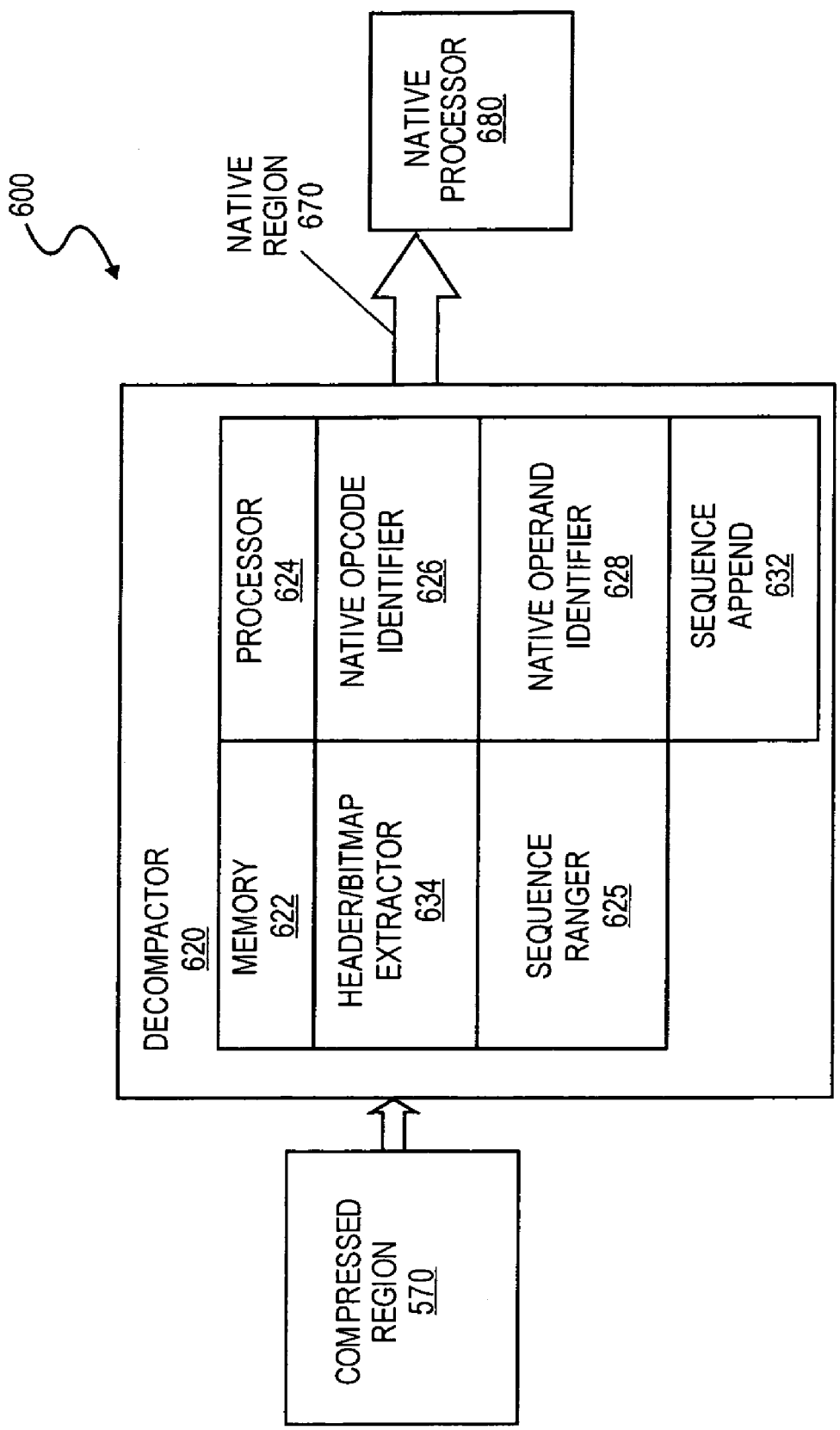
FIG. 6 is a block diagram of a decompactor.

FIG. 6 is a block diagram of a decompactor to de-compress, de-compact, and/or decode. FIG. 6 shows environment 600 including compressed region 570 (e.g., such as a compressed region of warm code JIT compiled from non-native code) as input to de-compactor 620 and native region 670 as output from de-compactor 620, such as for execution or processing by native processor 680. Native region 670 may represent a number of adjacent or un-adjacent JIT compiled native warm code regions of a sequence of instructions for native processor 680. De-compactor 620 includes memory 622 and processor 624. Memory 622 may store a software program or machine executable instructions (e.g., instructions accessed, loaded, or read from a machine readable medium) to be executed by processor 624 to de-compact or de-compress region 570 into region 670, such as according to FIGS. 3, 6, 8, and/or otherwise as described herein. Thus, other than the program sorted memory 622, memory 622 and processor 624 may be similar to memory 522 and processor 524 described for FIG. 5.

According to some embodiments, processor 680 may include de-compactor 620, region 570, and/or memory 580.

As such, region 570 may be de-compacted while being executed by processor 680, by having compressed regions of region 570 de-compacted by de-compactor 620 when encountered prior to or during the compacted regions execution by the processor. Native processor 680 may be a processor capable of executing a set or sequence of instructions, such as instructions 170 or a set, region, or sequence of instructions from which instructions 160 is a sequence (e.g., a program from set 105). Also, processor 680 may be an embedded processor, a native processor, a processor in a DBT environment, or a processor unable to execute instructions 160. However, processor 680 may be able to process or execute native sequence 670.

De-compactor 620 also includes header/bitmap extractor 634, such as an extractor for extracting headers and bitmaps of region 570, such as to extract header 262 and bit maps as described above with respect to FIG. 3. Moreover, header/bitmap extractor 634 may extract headers and bitmaps as described below with respect to blocks 810 and 830 of FIG. 8. De-compactors 620 also includes sequence ranger 625, such as a ranger to determine the range of a region of region 570 according to header information extracted by extractor 634. Moreover, ranger 625 may determine a range of a region as described below with respect to blocks 820 of FIG. 8.

Next, de-compactor 620 includes native opcode identifier 626, such as a de-compressor, de-compactor, interpreter, identifier, or compression table to identify native code, native compiled code, or native instructions for compression codes, compressed code, compressed instructions, opcode compression codes (e.g., codes 230) in compressed regions of region 570. For instance, identifier 626 may de-compress an instruction, and/or one or more opcodes as described above for table 302 of FIG. 3.

De-compactor 620 also includes native operand identifier 628, such as to de-compact, de-compress, identify, or decode compressed operands, operand compression codes (such as codes 250) of region 570 (such as compressed regions) to create region 670. Thus, identifier 628 may identify compiled native operands or other instructions to allow processor 680 to process region 670. For instance, identifier 628 may de-compress an instruction, and/or one or more operands as described above for table 304 of FIG. 3.

Figure 8:
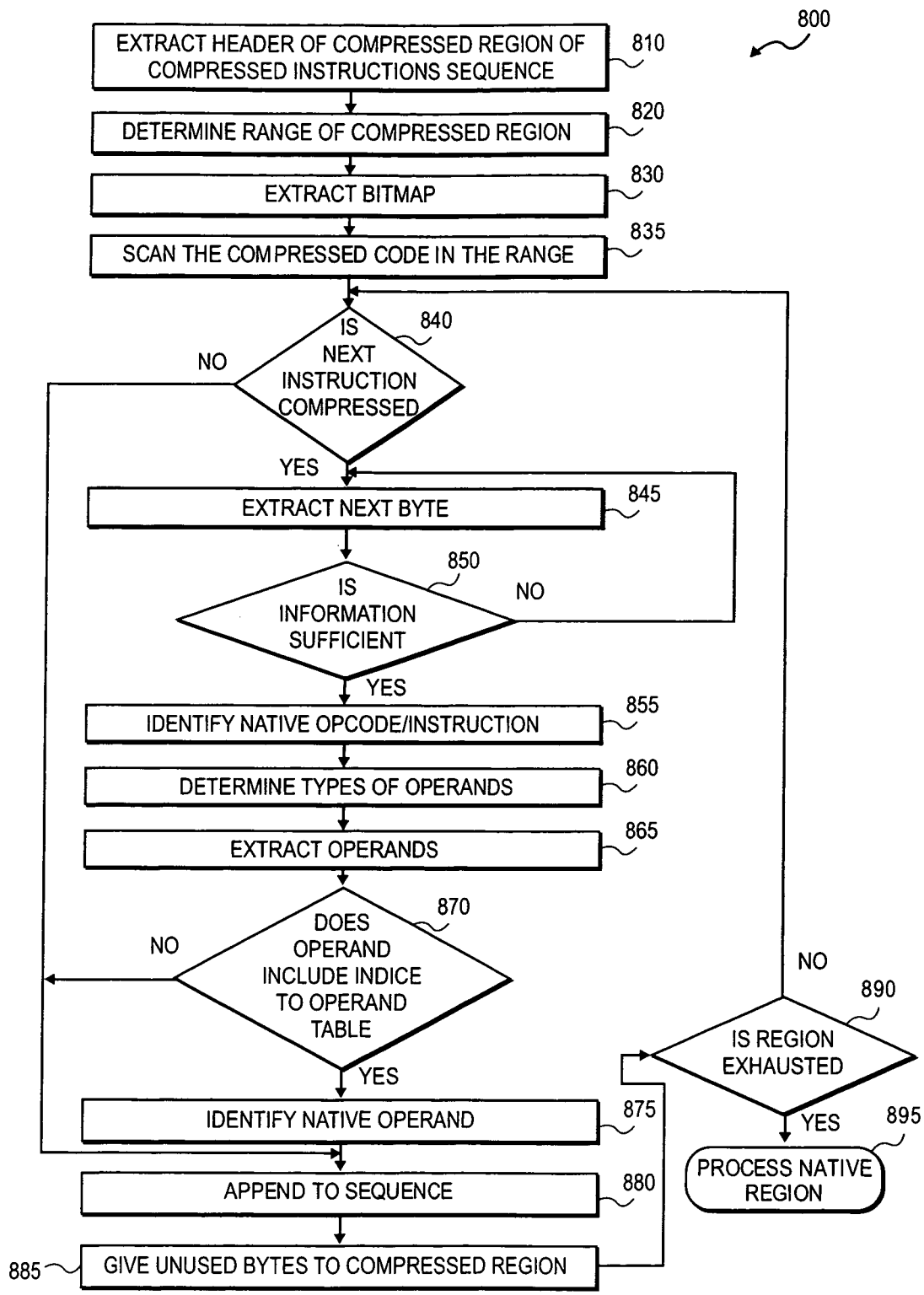
FIG. 8 is a flow diagram showing a process for de-compressing a compressed region of a compressed instruction sequence.

De-compactor 620 also includes sequence appender 632, such as an appender to append native opcode, native instructions, and/or native operands to a region (e.g., region 570 prior to de-compression and region 670 after completion of de-compression, as described for process 800 of FIG. 8) to create region 670. Thus, after de-compactor 620 de-compacts region 570, processor 680 may execute or process the native code of region 670. Prior to being executed or processed, de-compressed native code 670 can be kept in a memory or storage other than the code cache.

Compactor 520, memory 522, de-compactor 620, and/or memory 622 may include a machine accessible medium containing a sequence of instructions that when executed cause a machine (e.g., when executed by processor 524 cause compactor 520; and/or when executed by processor 624 cause de-compactor 620) to compress region of instructions 170 into region 570, and to de-compress region 570 into region 670 as described herein. Specifically, memory 522 and/or 622 may include instructions that cause warm code opcodes of instructions 170 to be compressed using table 526 and a portion of the operands corresponding to the compressed opcodes to be compressed using table 528, such as by separating the opcodes and operands and compressing each according to a different or independent compression technique, and de-compacting region 570 using identifier 626 and/or 628 to create region 670. Moreover, compacting operands using table 528 may include indexing into a table of commonly used operands for a region of instructions, sequence of instructions, or set of instructions a processor is capable of processing.

The systems and components shown in FIGS. 5 and 6 may represent electronic hardware, or software components and systems. For instance, environment 500, environment 600, compactor 520, memory 522, processor 524, sequence scanner 525, opcode compression table 526, operand compression table 528, operand compression table generator 527, appender 532, header generator 534, memory 580, de-compactor 620, memory 622, processor 624, sequence ranger 625, native opcode identifier 626, native operand identifier 628, sequence appender 632, header extractor 634, and/or native processor 680 may include one or more computer or electronic hardware and software components. Such components may include a processor, a memory to store an application (e.g., such as a software, source code, sequence of instructions, or compiled code application) to be executed by a machine or processor to cause an environment, compactor, de-compactor or components to perform the functions described herein. Moreover, an environment, compactor, de-compactor or components may be controlled by a computer or a machine, such as according to a machine accessible medium containing instructions (e.g., software, source code, or compiled code) that when executed by the computer or machine cause the computer or machine to control an environment, compactor, de-compactor or components to perform functions described herein.

Specifically, such components may include various logic circuitry, gates, computer logic hardware, memories (e.g., such as read only memory (ROM), flash memory, random access memory (RAM), flash memory, cache memory, firmware and/or other types of memory including electronic and/or magnetic media), comparators, data buffers, gates, flip-flops, and/or registers to perform functions described herein for the environment, compactor, de-compactor or components. Moreover, the environment, compactor, de-compactor and/or components thereof described above may include or access a machine accessible medium containing a first sequence of instructions that, when executed, causes a machine to perform functions described herein corresponding to the environment, compactor, de-compactor and/or components. In addition, it is contemplated that the function of the environment, compactor, de-compactor or components described above may be performed by a machine implemented method, such as a method implemented by hardware, software, a computer, a sequence of instructions, or according to a machine accessible medium as described above. In addition, according to embodiments, environment 500, environment 600, compactor 520, de-compactor 620, memory 580, and/or processor 680 or components thereof may be part of a DBT environment or translator.

FIG. 7 is a flow diagram showing a process for compressing a region of an instruction sequence. FIG. 7 shows process 700, such as a process for compacting a warm code native region of instructions 160 (e.g., region 170) into a region of region 570 (e.g., region 1 or compressed region 270). Process 700 may include descriptions such as according to FIGS. 3, 5, 6, a DBT environment, a DBT translator, and/or otherwise as described herein. At block 710, operands of a region of an instruction sequence are scanned. For example, block 710 may correspond to scanner 525 scanning regions of instructions 160 as described for FIG. 5.

At block 720, an operand compression table is created to compress a subset of operands. As noted for FIG. 3, opcodes and/or operands of a sequence or set of instructions can be divided, selected, identified, or assigned into groups, types, and/or subsets. For instance, certain ones of a sequence or set of instructions may be selected to be in a specific group or type of instructions (e.g., such as to be in COMP CODE 134, or NON-COMP CODE 136). Block 720 may correspond to generator 527 creating table 528 (e.g., table 304 as described for FIG. 3) as described above for FIG. 5.

At block 730, opcodes of the region are scanned. For example, block 730 may correspond to scanner 525 scanning opcodes of a region of instructions 160 to determine whether the opcodes are included in table 526, as described above for FIG. 5. At block 740, it is determined whether the scanned opcode is one of the subset of opcodes to be compressed. For example, block 740 may correspond to determining whether an opcode or an instruction is group or type of code to be compressed (e.g., see group 134 COMP, and type 180 COMP). In some cases, block 740 includes determining or identifying of an instruction or opcode is in table 302 (e.g., one of opcodes 220) of FIG. 3, or is included in table 526 of FIG. 5, as described above. If an instruction or opcode is not group or type of code to be compressed (e.g., see group 136 NON-COMP, and type 180 NON-COMP), it may not be necessary compress the instruction or opcode. Instead the instruction or opcode may be left as JIT compiled native code (e.g., the instruction or opcode was not selected to be compressed during process 400 of FIG. 4). If at block 740, the opcode is not one of the subset, processing continues to block 775. Alternatively, if at block 740 the opcode is one of the subset, processing continues to block 750.

At block 750, the opcode is compressed using an opcode compression table. Block 750 may correspond to compressing an opcode or instructions as described above with respect to table 302 of FIG. 3, region 270 of FIG. 3, and table 526 of FIG. 5, as described above. For instance, block 750 may include identifying, substituting, or switching a compression code of an instruction or opcode for a JIT compiled native instruction or opcode (e.g., substitute one of codes 230 for one of opcodes 220 of FIG. 3). In some cases, the opcode compression table used at block 750 may be the opcode compression table used at block 750 may be the opcode compression table constructed at block 440 of FIG. 4 as described above.

At block 760, it is determined whether the operand corresponding to the opcode compressed in block 750 is a subset of operands to be compressed. Block 760 may correspond to determining whether the operand is of an operand group or type to be compressed (e.g., similar to determining if an opcode is selected to be in group 134 COMP, and type 180 COMP). In some cases, block 760 includes determining or identifying of an operand is in table 304 (e.g., one of operands 240) of FIG. 3, or table 528 of FIG. 5, as described above. If at block 760, the operand is not one of the subset, processing continues to block 775. Alternatively, if at block 760 the operand is one of the subset, processing continues to block 770.

At block 770, the operand is compressed using the operand compression table. Block 770 may correspond to compressing according to table 304 of FIG. 3 or table 528 of FIG. 5 as described above. For instance, block 770 may include identifying, substituting, or switching a compression code of an operand for a JIT compiled native operand (e.g., substitute one of codes 250 for one of operands 240 of FIG. 3). In some cases, the operand compression table used at block 770 may be the operand compression table created at block 720.

At block 775, the appropriate data (e.g., including compressed and/or non-compressed fields) is appended to the sequence of instructions (e.g., a sequence starting as region 170 and ending as region 570 after process 700) and a bit map is marked appropriately. Marking a bitmap may include activating a bit (e.g., such as by setting the bit to a "high" or a "1"); or inactivating a bit (e.g., such as by setting a bit to a "low" or a "0"), where the bit activate or deactivated corresponds to the instruction or opcode compressed. For example, block 775 may correspond to appending an instruction that has neither opcode nor operand compressed and marking a bit map appropriately, such as where block 775 is reached from block 740. Alternatively, block 775 may correspond to appending an instruction with a compressed opcode and one or more operands not compressed and marking a bit map appropriately, such as where block 775 is reached from block 760. Also, block 775 may correspond to appending an instruction with an opcode compressed and one or all operands compressed and marking a bit map appropriately, such as where block 775 is reached from block 770. At block 780, it is determined whether the region of the sequence of instructions if exhausted. If the region is not exhausted, processing returns to block 740. Alternatively, if the region is exhausted, processing continues to block 785.

At block 785, the bit map for the region is inserted at the beginning of the compressed region. At block 790, the range of the compressed region is determined. Information identifying the range of the compressed region may be contained in or stored in a range field of the header for the region. At block 795, the header for the region is inserted at the beginning of the compressed region. For example, at block 785, a header and a region of region 570 may be created, such as header 262 and region 270 as described with respect to FIG. 3.

It is contemplated that if at block 780 the region is not exhausted, processing may return to block 740 instead of block 730, such as in the case where at block 730 all opcodes of the region are scanned at once.

FIG. 8 is a flow diagram showing a process for de-compressing a compressed warm code region of a compressed instruction sequence. FIG. 8 shows process 800 such as a process for de-compacting compressed region 270 having header 262 of region 570 to create a region having native compiled instructions of region 670. Process 800 may include descriptions such as according to FIGS. 3, 6, 8, a DBT environment, a DBT translator, and/or otherwise as described herein. At block 810, the header of a compressed region of a compressed instruction sequence is extracted. Block 810 may correspond to extractor 634 extracting a header of region 570 as described for FIG. 6.

At block 820, the range of the compressed region is determined. Block 820 may correspond to ranger 625 determining the range of a compressed region (e.g., region 270) of region 570 according to the header of that region (e.g., header 262). Block 820, may include reading or interpreting the information identifying the range of the compressed region contained in or stored in a range field of the header at block 790 of FIG. 7.

At block 830, the bit map for the compressed region is extracted. Block 830 may correspond to extracting the bit map placed at the beginning of the compressed region at block 785.

At block 835, the compressed code in the range is scanned. Block 835 may correspond to scanning the opcodes in the range and/or scanning as described above for block 730 of FIG. 7.

At block 840, it is determined whether the next instruction of the region is compressed. Block 840, may include reading or interpreting the bit map extracted at block 830.

If at block 880 the next instruction is not compressed, processing continues to block 880. Alternatively, if the next instruction is compressed, processing continues to block 845.

At block 845, the next byte of the instruction is extracted.

At block 850, it is determined whether the information in the extracted byte is sufficient to identify the native opcode or instruction. For instance, block 850 may include determining if there is enough bits extracted to identify a compression code for an instruction, opcode, and/or operand. In some cases, block 850 includes determining or identifying of an extracted code is in table 300 (e.g., one of opcodes 220 and/or operands 240) of FIG. 3, or is included in table 526 of FIG. 5, as described above. If at block 850 the information is not sufficient, processing returns to block 845. Alternatively, if at block 850 the information is sufficient, processing continues to block 855. At block 855, the native opcode or instruction is identified. Block 855 may correspond to identifying or substituting compiled native opcodes or instructions for compression codes as described above with respect to identifier 626 of FIG. 6. For instance, block 855 may include identifying, substituting, or switching a JIT compiled native instruction or opcode for a compression code of an instruction or opcode, such as according to table 302 (e.g., substitute one of opcodes 220 for one of codes 230) FIG. 3, or table 526 of FIG. 5, as described above.

At block 860, it is determined what the types of operands, their addressing modes, and the number of bits in the compact form is for the operands of the opcode or instruction of block 855. For example, block 860 may correspond to determining if there are operands having long addresses, what the addressing mode of those operands are, as described for extractor 634, ranger 625, and identifier 628 of FIG. 6. At block 865, the operands are extracted, such as described for identifier 628 of FIG. 6.

At block 870, it is determined whether the extracted operand include indices into the operand table. Block 870 may correspond to determining if an operand contains an indice to an address table to fetch a long address. If at block 870, the operand does not include an indice, processing continues to block 880. Alternatively, if at block 870 the operand does include an indice, processing continues to block 875. At block 875, a native operand is identified. Block 875 may correspond to identifying a native operand is described for identifier 628 of FIG. 6. In addition, block 875 may correspond to fetching a long address from an address table for an operand. For instance, block 875 may include identifying, substituting, or switching a JIT compiled native operand for a compression code of an instruction or operand, such as according to table 304 (e.g., substitute one of operands 240 for one of codes 250) of FIG. 3, or table 526 of FIG. 5, as described above.

At block 880, data (e.g., including de-compressed fields and/or fields that were not compressed during process 700) is appended to the sequence of instructions (e.g., a sequence starting as region 570 and ending as region 670 after process 800), such as described with respect to appender 632 of FIG. 6. For example, block 880 may correspond to appending an instruction that did not have a compressed opcode, operand, or field (e.g., an instruction that is not warm code to the region or sequence of instructions, such as when block 880 is reached from block 880). In this case, was not necessary to de-compress the instruction because the instructions was JIT compiled native code (e.g., the instruction was type NON-COMPRISES, or not compressed). Alternatively, block 880 may correspond to appending an instruction that had a compressed field or opcode and not has compiled native instructions in place of that code, but an instruction that does not have a compressed operand (such as an instruction that has cold code for an operand) to the region or sequence of instructions. Next, block 880 may correspond to appending an instruction that had a compressed opcode or field (such as an instruction now having compiled native code in place of the compacted opcode) and having at least one compacted operand (e.g., such as an instruction now having at least one compiled native code operand) to the region or sequence of instructions.

At block 885, unused bits are given to the compacted code. Block 885 may correspond to a de-compactor (e.g., de-compactor 620) extracting a sufficient number of bytes from the compacted code to identify an instruction or opcode (e.g., such as an x86 instruction). In some cases, only a portion of the extracted bytes of compacted code are necessary to identity the instruction or opcode, thus, the remaining part of the extracted compacted code is "unused" code that may be returned or given back to the compacted code (e.g., such as by re-appending to the compacted code at the location where they previously were). At block 890, it is determined whether the region is exhausted. If at block 890, the region is not exhausted, processing returns to block 840. Alternatively, if at block 890, the region is exhausted, decompression of the region is complete. For example, block 890 may correspond to producing a native region 670, such as a region including compiled native code in place of compressed warm code operands and/or opcodes. Thus, after block 890, the decompressed region (e.g., region 670) may be processed at block 895. For instance block 895 may include JIT compiled native code (e.g., region 670) processed by a native processor (e.g., processor 680, such as described with respect to FIG. 6).

The following is an example of selecting and compressing native code for DBT to an x86 processor, according to some embodiments. In this case, the native code or language may be executable by a processor that is unable to execute or process a set of instructions that can be executed by the x86 processor without translation, interpretation, a lookup table, etc., as described above (e.g., without the DBT environment). As noted above, selection and compression of warm code may also consider factors involved (e.g., time and memory required) for translating "hot" code (e.g., via just-in-time compiling), and factors involved (e.g., time and memory required) for interpreting "cold" code. For instance, the slow speed of interpretation raises an important question, i.e. when to interpret a code region and when to compile it instead. Obviously, if a code region is to be executed only once during the entire program execution, then it makes perfect sense to interpret. However, there may exist many code regions in a program which are executed thousands of times even though their run-time is a small percentage of the entire program execution.

For example, instance Table 1 lists the size and run-time for each code module in one benchmark of x86 instructions the BiQuad00 EEMBC benchmark, EEMBC: *The New Benchmark Standard for Embedded Processors*, Levy, Markus (EDN Magazine) and Weiss, Alan R.: (Motorola) Embedded Systems Conference, San Jose, November 1998. Moreover, other benchmarks may be considered and/or may show similar behavior. From these benchmarks, it can be observed that there exist a large number of code regions or modules which occupy significant memory. In each benchmark, a "warm" code region can be selected or identified where a region or module spends from 5% to 30% of the total execution time.

TABLE 1

Size and Execution Time Distribution for Benchmark Programs

| Functions | Sizes | % execution time |
|---|---|---|
| FxCascadeBiquadIIR | 374 | 50% |
| _output | 2058 | 11% |
| _crtLCMapStringA | 591 | 3% |
| _aulldiv | 112 | 3% |
| I10_OUTPUT | 659 | 2% |
| _crtGetEmvorpm,emtStromgsA | 314 | 2% |
| _intel_cpu_indicator_init | 268 | 2% |
| Al_signal_start | 12 | 2% |
| Heep_alloc | 262 | 2% |
| ... | ... | ... |

If the warm code accounts for just 5% of total execution time, with a slow-down factor of 70, the time to interpret the warm code will be 3.5 times as long as it takes to execute the entire program or sequence of instructions. Hence, the execution time of the entire program will be 4.5 times as long as it takes to execute the entire program directly. Even a slow-down factor of 20 would double the execution time of the entire program. In this case, performance can be increased (e.g., time to process reduced) by compressing or compacting the "warm" code instead of interpreting the warm code.

For instance, the warm code region can be compressed into a smaller region based on the issue frequency (e.g., percent of total execution time, or otherwise known in the art) and the design (e.g., number, type, and length, fields in the instructions) of the instructions in a DBT environment where a high level code region is compiled into an x86 code region. If a region is determined to be warm (but not hot) according to a certain profiling study, then the warm code region is compressed into a smaller region and stored in memory. Each time the program execution proceeds to a compressed code segment, e.g. when it invokes a compressed function, the compressed code can be de-compressed before being executed.

Moreover, the de-compressed code can be kept in a memory or storage other than the code cache. In these cases, it may be assumed or expected that the de-compressed code region will not be executed soon in the future. Also, if such a code region were saved in the code cache, it may be replaced soon anyway. Even when not stored in the code cache, the compressed code takes much less time to de-compress and execute than to be interpreted.

Each x86 instruction (including both the opcode and the operands), or fields thereof (e.g., by separating the opcodes and the other fields including operands of various formats) may be viewed as a pattern. Separating the fields can be defined as a practice called "independent compression of different fields." For x86 programs, two main sources of opportunities for compressing x86 machine code, are the opcode and the full-length addresses that appear in the operands. According to embodiments, the compression or coding of fields of the native program (e.g., the coding format) may consider the appearance frequency of each pattern such that the total code length for the fields is "minimized".

For example, the appearance frequency of different opcodes can be ranked. Table 2 lists the top 19 opcodes and their appearance frequency (in percentages) in benchmark programs. Herein, reference to "benchmark programs" or "benchmarks" may refer to a single benchmark program or more than on benchmark program (or the execution or run data of the benchmark program(s)). For instance, numbers, percentages, or other information described for "benchmark programs" or "benchmarks" may refer to numbers, percentages, or other information combined by addition, averaging, statistical combination, or another mathematical combination of data derived or gathered from one or more benchmark programs. Of the 19 opcodes, the top 16 opcodes together account for 66% of total instruction appearances in the benchmark programs. The pattern distribution is very similar across different applications in the benchmark suite.

TABLE 2

Top 19 Opcodes and Their Appearance Frequency

| Opocde # | Opcode | % Appearance Frequency |
|---|---|---|
| 1. | move-index | 0.10 |
| 2. | push1 | 0.092 |
| 3. | pop1 | 0.09 |
| 4. | call5 | 0.06 |
| 5. | move-esp | 0.03 |
| 6. | test-reg | 0.04 |
| 7. | je | 0.04 |
| 8. | jne | 0.03 |
| 9. | push3 | 0.03 |
| 10. | jmp2 | 0.027 |
| 11. | add3 | 0.024 |
| 12. | push2 | 0.024 |
| 13. | cmp3 | 0.023 |
| 14. | push5 | 0.02 |
| 15. | xor-reg | 0.02 |
| 16. | ret | 0.02 |
| 17. | mov5 | 0.018 |
| 18. | inc | 0.016 |
| 19. | lea3 | 0.013 |

The "profile" shown above can be collected by text matching in the assembly code and/or the machine code. Nonetheless, instructions with different number of operands can be considered different patterns. Such instructions normally have different opcodes. Hence, the statistics can be reasonably accurate.

Specifically, according to such profiling or benchmarks, compression table 300, opcode compression table 302, and/or operand compression table 304 of FIG. 3 may be generated. Likewise, according to such profiling or benchmarks, process 400 (e.g., block 410) of FIG. 4 may be performed.

For instance, the benchmarks may contain over 33500 move instructions which begin with the byte "8B" and may contain 12693 move instructions which begin with the byte "89". A large number of these may use an index register to access the memory. Thus, such instructions can be one group that four bits can be used to identify. Among these those using the esp as the index register can be treated specially and put in a "move-esp" category, because they are longer than the rest, which use an index register.

Additionally, the benchmarks contain instructions that move from register to register and begin with the byte "8B", which can be placed in the same group with three other instructions that are register to register.

It is noted that the xor instruction is mostly used to clear a register operand, and the test instruction is mostly used to make sure a pointer is null. Each of these is a two-operand instruction, even though both operands are identical when the instructions are used for the purpose stated above. Therefore, in the compression codes for these instructions, only one register needs to be identified. Furthermore, 4 bits can be used to represent both xor and test.

Also, 4 bits can be used to represent both add3 and push2 instructions. In addition, 4 bits can be used to represent both cmp3 and lea3 instructions. The inc instruction has just a single byte, which includes the register number. So, in some cases, it cannot be shortened further and may be removed from the list.

The instruction push1 (push one operand) usually appears in a group of four at the very beginning of a called function. Four registers may be saved by these instructions as a part of the calling sequence. Correspondingly, four pop1 instructions are executed immediately before the call returns. Since it is usually the same registers that are saved and restored, those four push1 instructions can be replaced by a code and those four pop1 instructions by another. From this point of view, each 4-instruction sequence appears with a frequency of 0.09/4=0.0225.

The benchmark program may contain 14400 instructions which have both operands in the registers. Among these, over 9400 instructions can be mov, 2140 can be cmp, 1900 can be add, and 1000 can be sub. Four bits can be used to represent the group which contain all these instructions. This group (called reg-reg) can therefore account for 4.8% of all the instructions.

Based on the discussions above, a revise frequency chart (Table 3) follows:

TABLE 3

Revised Frequency Chart

| Opcode # | Opcode | Revised % Appearance Frequency |
|---|---|---|
| 1. | mov-index | 0.10 |
| 2. | call5 | 0.06 |
| 3. | test-xor-reg | 0.06 |
| 4. | move-esp | 0.05 |
| 5. | add3-push2 | 0.048 |
| 6. | reg-reg | 0.048 |
| 7. | je | 0.04 |
| 8. | jne | 0.03 |
| 9. | push3 | 0.03 |
| 10. | jmp2 | 0.027 |
| 11. | cmp-lea | 0.023 |
| 12. | push1 | 0.0225 |
| 13. | pop1 | 0.0225 |
| 14. | push5 | 0.02 |
| 15. | ret | 0.02 |
| 16. | mov5 | 0.018 |

According to Table 3, at least 4 bits can distinguish 16 patterns, and 5 bits or more can distinguished more patterns. The opcode of x86 instructions often consists of 8 bits only. Hence, one choice is to compress only the top 16 patterns (e.g., $2^{(n)}$ instructions or opcodes) using 4 bits (e.g., n bits). It is also considered that the number of top patterns or opcodes chosen or selected to be compressed, is a power of two, such as $2^{(n)}$ instructions where the compression code is a uniform length code of n-bits. The rest of the patterns may be left un-compressed (e.g., treated as hot or cold code).

To tell a DBT decoder whether an instruction is compressed or not, a bit-map may be used at or in the beginning of each compressed code region. Here, within each compressed code region (e.g., warm code region), compressed instructions can be distinguished from those not compressed using a single bit of the bit-map for each instruction in the compressed region to indicate whether the instruction (or the sequence of instructions) is compressed or not. Thus, in effect, x+1 bits are used to compress each instruction in the compressed region, where x is the average number of bits to encode a pattern (e.g., opcode and possibly operands), and the +1 is the indicating bit of the bit-map.

According to embodiments, a header can be inserted in the beginning of a code region that has been compressed. Such a header can be a bit sequence that does not represent any legal instruction (e.g., any instruction the processor is to process, such as an instruction including an opcode). This header can be followed by a bitmap in which each bit corresponds to an instruction in the code region. The bit indicates whether the corresponding instruction is compressed. If a code region is not compressed at all, then no such header is inserted. The dispatcher in the DBT driver can hence simply examine the first byte of a code region to determine whether de-compression should be performed.

Compressing Opcodes

In the following section, we present details of implementing the 4-bit coding scheme, according to some embodiments. The bit-string assigned below to each pattern may be arbitrary.

Call5 (0000)

The overwhelming majority of call instructions in the benchmark may be call direct instructions. The opcode E8 is followed by a 32 bit displacement. The opcode and the displacement are compressed separately in the scheme. The displacement compression uses a displacement table such that frequently used displacements can be replaced by a shorter index in the compression code.

If the displacement is reduced to x bytes, the 40 bits of the entire call instruction are compressed into 4+8x bits.

Move-esp (0001)

| Mov reg, dword ptr [esp + disp] | 8B(hex) 01 reg 100 (bin) 24(hex) disp |
| Or Mov dword ptr [esp + disp], reg | 89(hex) 01 reg 100 (bin) 24(hex) disp |

The disp field represents a 1-byte displacement. The opcode 8B is for memory-to-reg movement, and the opcode 89 is for reg-to-memory movement. In the compression code we use a single bit d to indicate the movement direction. Thus, the compression code may be:

0001 d reg disp

This takes two bytes instead of four bytes.

Reg-reg (0010)

This category includes instructions which have both operands in the registers. According to benchmarks, among these, over 9400 instructions may be mov, 2140 may be cmp, 1900 may be add, and 1000 may be sub. An instruction format may be:

OP(hex) 11 reg1 reg2 (bin)

In the above, OP is the opcode (OP=2B for sub; OP=03 for add; OP=3B for cmp, and OP=8B for mov.) These instructions may be compressed into the following form:

0010 xy reg1 reg2

In the above, the two bits xy selects one out of the four kinds of instructions.

Test-reg, Xor-reg (0011)

The overwhelming majority of the test instructions and xor instructions in the benchmark programs are those having two identical register operands. This is used to verify whether the resister value is null.

| Test reg, reg | 85(hex) 11reg1 reg2 (binary) |
| Xor reg, reg | 33(hex) 11reg1 reg2 (binary) |

In some cases, reg1=reg2, and 3 bits can be sued to identify the register. Thus, a compression code may be:

0011 a reg

If a=1, it is the test instruction. Otherwise, it is the xor instruction.

Jne (0100), Je (0101)

In some cases, a majority of jne and je instructions use 8-bit displacement. The instruction's binary format may be:

75 xx for jne and 73 xx for je

Where xx is the displacement. It is considered that such a short displacement may not be compressed. For example, the je (or jne) opcode (1) may be compressed into four bits followed by the 8-bit displacement, or (2) may be compressed only when the displacement can be fit into 4 bits. Choice (1) covers more cases, but the decoding in the DBT will be somewhat more complex since the compression code is no longer byte-aligned. Case (2) may be preferred in some embodiments.

Push3, Push4 (0110)

These two kinds of push instructions push a memory operand, using the current esp or ebp as the index register, into the stack:

| Push dword ptr [esp + xx] | FF 74 24 xx or |
| Push dword ptr [ebp + xx] | FF 75 xx |

When esp is used as the index register, the leading bit of xx may be 0. When ebp is used as the index register, the leading bit of xx may mostly be 0. Hence, these two kinds of push instructions may be grouped together, using the leading bit to distinguish between the two.

The compressor or compactor in the DBT must be careful with verifying the leading bit. Specifically, if ebp is the index register, which the decoder should know by seeing FF75, the decoder should look at the leading bit of xx. If it is 0, it can be compressed into the format list here below. However it the leading bit of xx is 1, then it may not be compressed, in some cases.

One compression format may be:

0110 a yyyyyyy where the bit a distinguishes between the two cases (esp vs. ebp) and yyyyyyy is the last 7 bits of xx.

Jmp2 (0111)

According to some benchmarks, the overwhelming majority (over 90%) of the unconditional jump conditions are jump short:

EB xx

The instruction size can be reduced by 4 bits, assuming the code is compressed to 0111 followed by the displacement.

Push1 (1000)

The string of 1000 represents the following sequence of instructions which may routinely appear in the beginning of a function as part of the calling sequence:

| Push edi | 57 |
| Push esi | 56 |
| Push ebp | 55 |
| Push ebx | 53 |
| Sub esp, #n | 81 EC xx xx xx xx |

Listed alongside the assembly code is the opcode in Hexidecimal numbers. In the sub instruction, #n may be a positive integer. Normally #n is quite small although it is represented by 32 bits in the instruction. If #n can be represented by four bits, #n can be packed with 1000 to make a full byte. If #n requires more than four bits the bits "0000" can be packed with the compress opcode 1000, and an instruction of "Sub esp #n" can be inserted immediately after the Push1 pattern. Note that "Sub" may not be compressed under the current scheme.

With this pattern, either 4 or 10 bytes can be compressed into a single byte.

Pop1 (1001)

The string of 1001 represents the following sequence of instructions which routinely appear immediately before the "ret" instruction as part of the returning sequence.

| Add esp, #n | 81 C4 xx xx xx xx |
| Pop ebx | 5B |
| Pop ebp | 5D |
| Pop esi | 5E |
| Pop edi | 5F |

Again, if #n can be represented by four bits, #n can be packed with 1001 to make a full byte. Otherwise, 0000 can be packed with 1001 and an instruction of "Add esp, #n" can be inserted immediately before the Pop1 pattern.

With this pattern, either 4 or 10 bytes can be compressed into a single byte.

Add3, Push2 (1010)

Some benchmark programs contain about 11360 add instructions. Among these, 7430 instructions are of the form "83C(hex) 0xxx(bin) YY", where xxx indicates a register and YY is a byte-size integer. Interestingly, 4530 among the 7430 add instructions are of the form "83 C4 YY", which add YY to the esp register.

Two choices of encoding are explored. One is to use the code "1010" to represent the prefix "83C(hex)0(bin)". Then append xxx to "1010". The number YY is not compressed. In the other choice, use the code "1010" to represent "83 C4". The first choice takes 16*7430=118880 bytes to represent those 7430 "83 Cx" add instructions. The second choice takes 12*4530+24*2900=123960 bytes. Hence, the first choice may be used with a reduction rate of 33%.

Since xxx has only three bits, we have another bit to spare. The push2 instruction is similar to add3 in the formation (The push2 instruction has the bit pattern of "6A YY", where YY is a byte-sized integer). Hence, push2 can be merged with add3, and a bit, a, can be used to distinguish them.

The compressed representation may be:

1010 a=0 reg YY for Add3 or 1010 a=1 ??? YY for push2

Push5 (1011)

This group of push instructions is in the form of:

"68 disp32", where disp32 is a 4-byte address. This form may be represented by the compress code:

"1011 index"

where "index" is an index to a displacement table of long addresses of operands.

Ret (1100)

The opcode C3 can be represented in the compression code by "1100".

Mov5 (1101)

This set of move instructions may be in the forms of:

"C74(hex) 0 reg yy disp24" and "C70(hex) 0 reg disp32", where the 3-bit reg selects a register, yy is a byte-size offset, disp24 a 3-byte displacement, and disp32 a 4-byte displacement.

This form may be represented by a byte "1101 a reg" which is followed by additional operands. If a=1, then it is in the form of "C74" and the byte is followed by yy and disp24. If a=0, then it is in the form of "C70" and the byte is followed by disp32.

Cmp, Lea (1110)

Some benchmark programs contain about 16300 cmp instructions. Among these, 4370 are of the form "3B(hex)11 reg1 reg2(bin)", and another 4024 are of the form "83 F(hex) 1 reg yy" where reg is a three bit register number and yy is a byte-size integer".

The benchmark programs also contain about 10550 lea instructions. Among these, more than 5000 are of the form "8D(hex) 01 reg1 reg2(bin)".

The compression code "1110" can be used to represent all the forms mentioned above by:

1110 a reg1 [b reg2] [yy]

If a=1, then it is the "83F" form of the cmp instruction. The byte-size integer follows the bits "1110 1 reg1". If a=0, then the next byte "b reg2" can be examined. If b=1, then it is the "3B" form of the cmp instruction. If b=0, then it is the "8D" form lea instruction.

Mov-index (1111)

Some benchmark programs contain over 33500 move instructions which begin with the byte "8B". Within these, we have encoded the "mov-esp" and "move register to register" instructions. Among the remaining 17800 "8B" move instructions, 16600 may be of the form:

8B(hex) 01 reg1 reg2 YY

In the above, reg1 is the destination register and reg2 is the index register used in the memory load operation. YY is a byte-size integer used as the offset.

Similarly, the benchmark programs may also contain 11979 instructions which move from a register to a memory location. These may be in the form of:

89(hex) 01 reg1 reg2 YY

Finally, some benchmark programs may contain 2390 move instructions which move immediate data to a memory location using a register as the index. These instructions can be in the form of:

C74(hex) 0 reg YY ZZ ZZ ZZ

In the above, reg is the index register, YY is the offset, and ZZ ZZ ZZ is a three-byte immediate data.

These instructions can be grouped together and represented in the following form:

1111 a reg1 b [reg2] [YY] [ZZ ZZ ZZ]

If a=0 then the instruction is "C74" and it ends at reg1. If a=1, then additional operands can be looked for. If b=0, the instruction is "8B". Otherwise it is "89".

Thus, opcodes of x86 compiled warm code may be compressed according to an opcode compression table (e.g., see table 302 if FIG. 3) set up using the coding above. The compressed warm code can be stored so that during execution the compressed warm code can be de-compressed, such as using an opcode identification or de-compression table to de-compress the compressed opcodes into native code (e.g., non-x86 instructions) more quickly than by translation (e.g., re-JIT compiling) or by interpretation of the warm code. Using benchmark programs, opcode compression and de-compression (e.g., identification) tables can be setup in a DBT environment (e.g., such as by storing the tables and/or software to perform the compression and de-compression) prior to compiling or even receiving native programs in the DBT environment (e.g., see FIGS. 7 and 8).

In addition, the operands may be compressed for instructions having or not having compressed opcodes. Operands of warm code may be compressed according to an operand compression table (e.g., see table 304 if FIG. 3), and stored so that during execution the compressed warm code can be de-compressed, such as using an operand identification or de-compression table to de-compress the compressed operands into native code, operand information, or addresses more quickly than translation (e.g., re-JIT compiling) or by interpretation of the warm code. Such operand compression and tables can be setup in a DBT environment (e.g., such as by storing the tables and/or software to perform the compression and de-compression) prior to or during translation (e.g., JIT compiling) and/or compression of warm regions, opcodes, and/or after receiving native programs in the DBT environment (e.g., see FIGS. 7 and 8).

Compressing Operand Long Addresses

This section describes factors considered to select, or during compression and de-compression of, warm code operand long addresses. For instance, for de-compression of compressed warm code according to embodiments, after decoding the opcode, the DBT driver determines which operand is a long address (or a long displacement). In the compression code, the long address is represented by an index to a table (called the displacement table or the address table, such as native operand identifier 628 of FIG. 6, such as to identify a native operand as described for block 875 of FIG. 8).

Profiling may be used to determine whether each opcode, each function, and/or each code module should have its own displacement table (e.g., table 304, and/or native operand identifier 628 of FIG. 6, such as to identify a native operand as described for block 875 of FIG. 8). Nonetheless, it is contemplated that at least each individual program (e.g., sequence of instructions) can have its own displacement table.

To reduce the size of the displacement table, any or all of the following measures may be taken:

1. Although x86 machine code normally uses program counter relative displacement, base-relative displacement may be used for the compression code for operands. This is because a base can be found such that all the displacements are nonnegative, making the displacements share more common bits.

2. The displacement table can have multiple levels. Whether different instruction types should have their separate displacement tables may depend on profiling studies. For benchmark programs, a single table and a single base address may be sufficient.

3. The beginning position of the program may be chosen as the base address. In the benchmarks, e.g., the base address is always 00400000(hex). Here, the first four hexadecimal digits may be appended by an x-bit displacement-table index and a y-bit offset. For simplicity of illustration, let y=8.

4. During the compression time, some optimal choices for x and y may be determined as follows:

4.1 Within a range of possible values of x, e.g. 2<x<8, an optimal choice may be obtained by considering x from the low value to the high value. The offset table can contain $2^x$ entries. A greatest number z can be found such that all prefixes of the length z have no more than $2^x$ varieties. The compression benefit is thus z−x.

4.2 A value for x may be selected which gives the maximum value of z−x>0.

The DBT may compress one warm code region at a time without necessarily knowing the patterns of the rest of the program. Thus, various systems or methods may be used to dynamically determine one or more compression tables to compress and identification or displacement tables (e.g., such as tables shared by the entire program) to compress and de-compress operands as described above.

A Compression Ratio Using 4-Bit Code

This section describes a compression ratio for instructions using a 4-bit compression code for opcodes and the operand long address compression scheme described above in the Compressing Opcodes and Compressing Operand Long Addresses sections. Also, note that in some embodiments, operands are not compressed for instructions which would only have compressed operands, but are not compressed at all instead (e.g., resulting in an instruction without compressed opcode or operand). For example, operands will not be compressed for instructions in which at least one field other than an operand, such as opcode, will not be compressed. This may be because it is yet unclear how much a long addresses (or displacements) can be compressed in these cases, and since it is a rather complex matter to define the length of the opcode. Hence, in some embodiments:

For call5 instructions, the 8-bit opcode is reduced to 4 bits.

The move-esp pattern have the register esp implied. Reduce 32 bits to 16 bits.

For reg-reg instructions, reduce 24 bits to 12 bits.

For test-reg and xor-reg instructions, reduce 16 bits to 8 bits.

For Jne and Je instructions, reduce 16 bits to 12 bits.

For push3 and push4 instructions reduce 32 bits (or 24 bits) to 12 bits.

For jmp2 instructions, reduce 16 bits to 12 bits.

Assume all push1 and pop1 instructions are in the push sequence and the pop sequence, respectively. Without compression, each push or pop pattern takes 32 bits in the instructions. Reduce them to 4 bits.

For add3, reduce 24 bits to 16 bits. For push2 instructions reduce 16 bits to 12 bits.

For push5 and ret instructions, reduce 8 bits to 4.

For mov5 instructions, ignore the long displacement. Reduce 24 bits (or 16 bits in the case of "C70") to 16 bits (or 8 bits in the case of "C70").

For cmp and lea instructions, either reduce 16 bits to 12 bits, or reduce 24 bits to 16 bits.

For mov-index instructions, reduce 24 bits to 16 bits.

Multiplying the estimated number of bits by the frequencies in Table 2, get the average number of bits before compression

Y1=8.568/0.619=13.84

After compression, on average

Y2=3.984/0.619=6.436 bits.

If, however, those instructions not compressed are included, and assume they are 8 bits each, then:

Y1=8.568+8*0.381=11.616,

Y2=3.984+8*0.381=7.032.

The compression scheme on techniques above for x86 compiled code result in an estimate saving of 39.4% during execution of a sequence of instructions, based on the profiling information collected from one set of existing x86 sequences of instructions, and if the rest of the potential operands are ignored in the savings analysis. Of course, this is an estimate and actual results will vary depending on how many there are and how much the other operands can be compressed.

Also, in the DBT environment, a translator can be allowed to generate (e.g., compile) the x86 compiled code using the 16 patterns as much as possible. In other words, the translation or compiling of non-native code to native code can be performed in such a manner that the resulting native code has an increased instance of using the 16 patterns (e.g., of instructions in type of code COMP of types 180 of FIG. 3). This will increase the appearance frequency of those patterns in the DBT environment. Specifically, the increase in appearance of those patterns may be considered in selecting the instructions and/or instruction regions that will be warm code. It is also contemplated to look for other common instruction sequences, other than the 16 above, which can be replaced by a compression code as described herein.

Although descriptions above, including with respect to FIGS. 1-8, are with respect to opcodes and operands of native x86 compiled instructions, the concepts can be applied to other fields of x86 instructions, other compiled instructions, other native instructions, and/or other languages or sets of instructions. Also, the concepts described herein may be applied using other coding systems. Specifically, other uniform length codes may be used to code the opcodes, and/or operands. In some cases a uniform length code that increases in binary count for each opcode or operand encoded may be used. It is also considered that the concepts described herein may be applied to other translation environments where one or more instructions are to be translated from a language or instruction set of one processor to a different language or instructions set of a different type or processor.

In the foregoing specification, specific embodiments are described. However, various modifications and changes may be made thereto without departing from the broader spirit and scope of embodiments as set forth in the claims. The specification and drawings are, accordingly, to be regarded in an illustrative rather than a restrictive sense.

What is claimed is:

1. A method comprising:
    selecting a subset of a plurality of opcodes included in a native instruction set a processor is capable of processing;
    assigning a code to each of the opcodes of the subset; and
    constructing a compression table to alter a native sequence of instructions including at least one of the selected opcodes of the subset by replacing the at least one opcode with a code assigned to the at least one opcode to compress the native instructions such that the altered sequence of instructions is configured to be processed by a dynamic binary translator (DBT), wherein the selecting includes profiling according to a frequency of appearance of an opcode during execution of a plurality of benchmark sequences of instructions.

2. The method of claim 1, wherein the number of opcodes of the subset is a power of two and each code comprises a uniform length code.

3. The method of claim 1, wherein the compression table includes a plurality of replacements from the subset of the plurality of opcodes to a plurality of assigned codes to alter a region of warm code defined by a region of a non-native sequence of instructions encountered by the DBT during execution a number of times less than hot code threshold number but more than a cold code threshold number.

4. The method of claim 1, wherein selecting includes profiling according to a size of an opcode, and a number of occurrences of a region of instructions including an opcode repeating in the plurality of sequences.

5. The method of claim 1, wherein selecting includes considering a relative frequency as compared to others of the opcodes of one of an opcode's appearance in a plurality of sequences of instructions, of an opcode's execution in the plurality of sequences of instructions, and of a region of a sequence of instructions in the sequences of instructions.

6. The method of claim 1, further comprising:
the dynamic binary translator (DBT) translating a non-native sequence of instructions of a non-native instructions set the processor is not capable of processing to the native sequence of instructions, wherein translating includes compiling a region of the non-native sequence into a region of the native sequence; and
compressing the region of instructions of the native sequence of instructions according to the compression table.

7. The method of claim 1, wherein each code is an opcode compression code, the compression table is an opcode compression table, and further comprising:
selecting a subset of a plurality of operands included in the instruction set;
assigning an operand compression code to each of the operands of the subset; and
constructing an operand compression table to alter a sequence of instructions including at least one of the operands of the subset by replacing the at least one operand with the operand compression code assigned to the at least one operand.

8. The method of claim 7, wherein selecting a subset includes:
scanning of the operands of the sequence of instructions;
selecting an operand comprising one of a full length address, a long address, and a long displacement.

9. The method of claim 7, wherein each operand compression code comprises a uniform length code providing base relative displacement according to a base address.

10. The method of claim 7, wherein each opcode of the subset is part of an instruction including the opcode and a corresponding operand, and the subset of operands include absolute addresses of corresponding operands of a region of the subset of opcodes.

11. The method of claim 7, further comprising:
constructing the opcode compression table prior to compiling a region of compiled non-native instructions into compiled native instructions;
compiling the region into compiled native instructions;
compressing the region of instructions, wherein compressing comprises altering the region of instructions using the opcode compression table and the operand compression table;
constructing the operand compression table during compressing the region of instructions.

12. A method comprising:
collecting execution data for a native sequence of instructions having a plurality of fields and that a native processor is capable of processing;
assigning each instruction in the sequence to one of a plurality of groups;
identifying a code to compress at least one field of each of the instructions in a first of the groups; and
identifying to be interpreted during execution by the native processor, instructions of a non-native sequence of instructions that a dynamic binary translator would translate to a different second of the groups, wherein identifying a code includes profiling according to a frequency of appearance of an opcode during execution of a plurality of benchmark sequences of instructions.

13. The method of claim 12, wherein the native sequence of instructions are translated from a non-native instruction set a non-native processor is capable of processing and the native processor is not capable of processing, and the execution data comprises data for executing the translated sequence of instructions on a native processor capable of processing the native set of instructions.

14. The method of claim 12, wherein the plurality of fields includes an opcode field and an operand filed, and identifying a code comprises:
separating a plurality of opcodes of the instructions from a plurality of corresponding operands of the instructions;
selecting a first compression process for the opcodes and a second compression process for the operands.

15. The method of claim 12, wherein the execution data includes a frequency of appearance of an instruction in the native sequence, a size of the instruction, and a number of occurrences of a region of instructions in the native sequence including the instruction.

16. A machine accessible medium containing a first sequence of instructions that, when executed, cause a machine to:
compress a region of a second sequence of instructions of a native instruction set a first processor is capable of processing, wherein compressing the region comprises:
compressing the most frequent $2^{(n)}$ instructions of the region to appear in a plurality of third sequences of instructions of the native instruction set, using an n bit uniform coding;
compressing at least one operand of the most frequent $2^{(n)}$ instructions using a uniform coding process having a selected number of code bits;
wherein the region of the second sequence of instructions are to be translated by a dynamic binary translator from a non-native sequence of instructions executable by a different second processor that is capable of processing a different native set of instructions, wherein the at least one operand is selected based on profiling according to a frequency of occurrence of an opcode during execution of a plurality of benchmark sequences of instructions.

17. The machine accessible medium of claim 16, wherein the region of the second sequence of instructions include a plurality of different types of opcodes and a plurality of corresponding operands, and wherein compressing the region further comprises:
separating a plurality of opcodes in the region from a plurality of operands corresponding to the opcodes;
compress the opcodes with a first compression process;
compress the operands with a second compression process.

18. The machine accessible medium of claim 16, wherein the first compression process comprises replacing the opcodes with a uniform length code and identifying the existence of the replaced opcode, in a header of the region, and the second compression process includes indexing into a table of commonly used operands.

19. An apparatus comprising:
a compactor to compress, into a compressed region, a plurality of fields of a plurality of pre-selected instructions of a region of a native sequence of instructions a native processor is capable of processing, the native sequence of instructions to be translated from a non-native sequence of instructions a non-native process is capable of processing; and a memory to store the compressed region, wherein the compressed region can be de-compressed and processed by the native processor in a dynamic binary translation (DBT) environment more quickly than a corresponding region of the non-native sequence can be interpreted in the DBT environment, wherein the preselected instructions are preselected based on profiling according to a frequency of appearance of an opcode during execution of a plurality of benchmark sequences of instructions.

20. The apparatus of claim 19, wherein the plurality of fields comprise a first field to cause the native processor to perform an operation, and a second field to provide information used when the native processor performs the operation.

21. The apparatus of claim 20, wherein the compactor further comprises a first table to replace the first field of the plurality of pre-selected instructions with a first set of compression codes; and a second table to replace the second field of a subset of the plurality of pre-selected instructions with a second set of compression codes.

22. The apparatus of claim 19, wherein the memory is a first memory and further comprising a second memory storing an application program that when executed by the processor causes the compactor to compress the first and second fields and store the compressed sequence in the first memory.

23. The apparatus of claim 19, wherein the compactor is part of a dynamic binary translator, and comprises a first table having entries to replace a first code in a first field of the plurality of pre-selected instructions with a second code, and a second table having entries to replace a third code in a second field of a subset of the plurality of pre-selected instructions with a fourth code.

24. The apparatus of claim 23, further comprising a de-compactor to de-compress the compressed region into a de-compressed region, the de-compactor comprising:

a third table having entries to replace the second code in a first field of the compressed region with the first code, and a fourth table having entries to replace the fourth code in the second field of the subset of the plurality of pre-selected instructions with the third code.

25. The apparatus of claim 24, wherein the plurality of pre-selected instructions is a number of instructions equal to a multiple of $2^{(n)}$ instructions, the second code is an n bit uniform length code, and the memory has less data storage than a memory able to store the native sequence of instructions; and further comprising:

a native processor to execute the de-compressed region; and a bitmap including a plurality of distinguishing bits corresponding to a plurality of first code replaced to identify which first codes are compressed.

* * * * *